(12) United States Patent
Lloyd et al.

(10) Patent No.: US 11,188,931 B1
(45) Date of Patent: *Nov. 30, 2021

(54) DETECTION AND EXPLANATION OF LIFTS IN MERCHANT DATA

(71) Applicant: Square, Inc., San Francisco, CA (US)

(72) Inventors: Levon J. Lloyd, Secaucus, NJ (US); Nader Al-Naji, New York, NY (US); Matthew Ivor Lloyd, Long Island City, NY (US)

(73) Assignee: Square, Inc., San Francisco, CA (US)

( * ) Notice: Subject to any disclaimer, the term of this patent is extended or adjusted under 35 U.S.C. 154(b) by 160 days.

This patent is subject to a terminal disclaimer.

(21) Appl. No.: 16/162,984

(22) Filed: Oct. 17, 2018

Related U.S. Application Data

(63) Continuation of application No. 14/524,684, filed on Oct. 27, 2014, now Pat. No. 10,140,623.

(51) Int. Cl.
*G06Q 30/02* (2012.01)

(52) U.S. Cl.
CPC ..... *G06Q 30/0202* (2013.01); *G06Q 30/0201* (2013.01); *G06Q 30/0205* (2013.01)

(58) Field of Classification Search
CPC ............... G06Q 30/02; G06Q 30/0205; G06Q 30/0201; G06Q 30/0204; G06Q 30/0202
See application file for complete search history.

(56) References Cited

U.S. PATENT DOCUMENTS

| | | |
|---|---|---|
| 5,583,763 A | 12/1996 | Atcheson et al. |
| 5,679,943 A | 10/1997 | Schultz et al. |
| 6,128,415 A | 10/2000 | Hultgren, III et al. |
| 6,430,539 B1 | 8/2002 | Lazarus et al. |
| 6,839,682 B1 | 1/2005 | Blume et al. |
| 7,092,929 B1 | 8/2006 | Dvorak et al. |
| 7,165,037 B2 | 1/2007 | Lazarus et al. |

(Continued)

FOREIGN PATENT DOCUMENTS

WO 2015/081002 A1 6/2015

OTHER PUBLICATIONS

Non Final Office Action dated Nov. 27, 2019, for U.S. Appl. No. 16/177,068, of Grodin, S., et al., filed Oct. 31, 2018.

(Continued)

*Primary Examiner* — William S Brockington, III
(74) *Attorney, Agent, or Firm* — Lee & Hayes, P.C.

(57) ABSTRACT

A service provider may receive merchant analytics information from a plurality of merchant devices. In some examples, the service provider may generate a model based at least in part on the merchant analytics information, the model including a core set of features for predicting a merchant metric associated with a merchant. The service provider may detect a lift in an observed value of the merchant metric based at least in part on a residual value of the merchant metric at a location of the lift, and add an additional feature to the model to cause a predicted value of the merchant metric to correspond to the observed value of the merchant metric at the location of the lift. The service provider may further send information associated with the feature to a merchant device associated with the merchant. As an example, the information may include a prediction for the merchant metric and/or a recommendation for improving the business of the merchant.

19 Claims, 11 Drawing Sheets

(56) References Cited

U.S. PATENT DOCUMENTS

| | | | |
|---|---|---|---|
| 7,769,640 B2 | 8/2010 | Klenske | |
| 7,857,212 B1 | 12/2010 | Matthews | |
| 8,055,548 B2 | 11/2011 | Staib et al. | |
| 8,231,055 B2 | 7/2012 | Wen | |
| 8,297,507 B2 | 10/2012 | Kayani | |
| 8,302,860 B2 | 11/2012 | McKelvey | |
| 8,584,940 B2 | 11/2013 | Mesaros | |
| 8,700,060 B2 | 4/2014 | Huang | |
| 8,805,090 B1 | 8/2014 | Yagnik et al. | |
| 9,135,629 B2 | 9/2015 | Simeonov | |
| 9,424,590 B2 | 8/2016 | Gerard | |
| 9,697,531 B1 | 7/2017 | Bourget | |
| 10,140,623 B1 | 11/2018 | Lloyd et al. | |
| 2001/0014868 A1 | 8/2001 | Herz et al. | |
| 2001/0018665 A1 | 8/2001 | Sullivan et al. | |
| 2001/0047308 A1 | 11/2001 | Kaminsky et al. | |
| 2002/0073304 A1 | 6/2002 | Marsh et al. | |
| 2003/0004739 A1 | 1/2003 | Mcever | |
| 2003/0132298 A1 | 7/2003 | Swartz et al. | |
| 2004/0198389 A1 | 10/2004 | Alcock et al. | |
| 2004/0243468 A1 | 12/2004 | Cohagan et al. | |
| 2005/0010702 A1 | 1/2005 | Saito et al. | |
| 2005/0060245 A1 | 3/2005 | Hoffman et al. | |
| 2005/0139662 A1 | 6/2005 | Eglen et al. | |
| 2005/0234763 A1 | 10/2005 | Pinto et al. | |
| 2006/0229806 A1 | 10/2006 | Forlenza et al. | |
| 2006/0229996 A1 | 10/2006 | Keithley et al. | |
| 2007/0016494 A1* | 1/2007 | Brown | G06Q 10/087 705/28 |
| 2007/0063048 A1 | 3/2007 | Havens et al. | |
| 2007/0130090 A1 | 6/2007 | Staib et al. | |
| 2008/0027818 A1 | 1/2008 | Broadhead | |
| 2008/0082373 A1 | 4/2008 | Durocher et al. | |
| 2009/0033491 A1 | 2/2009 | Saunders | |
| 2009/0090783 A1 | 4/2009 | Killian et al. | |
| 2009/0249342 A1 | 10/2009 | Johnson | |
| 2009/0271275 A1 | 10/2009 | Regmi et al. | |
| 2010/0153174 A1 | 6/2010 | Angell et al. | |
| 2010/0202339 A1 | 8/2010 | Chieng et al. | |
| 2010/0241838 A1 | 9/2010 | Cohen et al. | |
| 2010/0280880 A1 | 11/2010 | Faith et al. | |
| 2010/0323716 A1 | 12/2010 | Jaffri | |
| 2011/0004506 A1 | 1/2011 | May et al. | |
| 2011/0015987 A1 | 1/2011 | Chakraborty et al. | |
| 2011/0231257 A1 | 9/2011 | Winters | |
| 2011/0238538 A1 | 9/2011 | Allison, Jr. et al. | |
| 2011/0282733 A1 | 11/2011 | Gnanasambandam et al. | |
| 2011/0302013 A1 | 12/2011 | Dance et al. | |
| 2012/0026018 A1 | 2/2012 | Lin | |
| 2012/0094639 A1 | 4/2012 | Carlson et al. | |
| 2012/0095870 A1 | 4/2012 | McKelvey | |
| 2012/0101894 A1 | 4/2012 | Sterling et al. | |
| 2012/0239524 A1 | 9/2012 | Ouimet et al. | |
| 2012/0278172 A1 | 11/2012 | Mercuri et al. | |
| 2012/0290553 A1 | 11/2012 | England et al. | |
| 2012/0303425 A1 | 11/2012 | Katzin et al. | |
| 2012/0310687 A1 | 12/2012 | Carter | |
| 2012/0310732 A1 | 12/2012 | Heiser, II et al. | |
| 2012/0323663 A1 | 12/2012 | Leach | |
| 2013/0054367 A1 | 2/2013 | Grigg et al. | |
| 2013/0066740 A1 | 3/2013 | Ouimet et al. | |
| 2013/0117086 A1 | 5/2013 | Mesaros | |
| 2013/0124263 A1 | 5/2013 | Amaro et al. | |
| 2013/0132140 A1 | 5/2013 | Amin et al. | |
| 2013/0132246 A1 | 5/2013 | Amin et al. | |
| 2013/0132887 A1 | 5/2013 | Amin et al. | |
| 2013/0137367 A1 | 5/2013 | Fisher | |
| 2013/0138492 A1 | 5/2013 | Delgado et al. | |
| 2013/0166398 A1 | 6/2013 | Minde | |
| 2013/0246207 A1 | 9/2013 | Novak et al. | |
| 2013/0246301 A1 | 9/2013 | Radhakrishnan et al. | |
| 2013/0346201 A1 | 12/2013 | Bilange | |
| 2013/0346221 A1 | 12/2013 | Rangachari et al. | |
| 2014/0089193 A1 | 3/2014 | Boding et al. | |
| 2014/0108209 A1 | 4/2014 | Lo Faro | |
| 2014/0129135 A1 | 5/2014 | Holden et al. | |
| 2014/0129302 A1 | 5/2014 | Amin et al. | |
| 2014/0129951 A1 | 5/2014 | Amin et al. | |
| 2014/0138435 A1 | 5/2014 | Khalid | |
| 2014/0164192 A1 | 6/2014 | Brown et al. | |
| 2014/0172476 A1 | 6/2014 | Goulart | |
| 2014/0180767 A1 | 6/2014 | Villars | |
| 2014/0207524 A1 | 7/2014 | Just | |
| 2014/0207614 A1 | 7/2014 | Ramaswamy et al. | |
| 2014/0207626 A1 | 7/2014 | Braxton | |
| 2014/0213300 A1 | 7/2014 | Spears et al. | |
| 2014/0229323 A1 | 8/2014 | Or et al. | |
| 2014/0278799 A1 | 9/2014 | McLean | |
| 2014/0278804 A1 | 9/2014 | Lanxner et al. | |
| 2014/0279185 A1 | 9/2014 | Merz et al. | |
| 2014/0316888 A1 | 10/2014 | Villars | |
| 2014/0365301 A1 | 12/2014 | Rappoport et al. | |
| 2015/0081349 A1 | 3/2015 | Johndrow et al. | |
| 2015/0081418 A1 | 3/2015 | Sahai | |
| 2015/0100383 A1 | 4/2015 | Chauhan | |
| 2015/0112762 A1* | 4/2015 | Lahmar | G06Q 30/0202 705/7.31 |
| 2015/0149254 A1 | 5/2015 | Sakamoto | |
| 2015/0193784 A1 | 7/2015 | Gao et al. | |
| 2015/0317653 A1* | 11/2015 | Ettl | G06Q 30/0202 705/7.31 |

OTHER PUBLICATIONS

Chu, C., and Zhang, G.P., "A comparative study of linear and nonlinear models for aggregate retail sales forecasting," International Journal of Production Economics, vol. 86, Issue 3, pp. 217-231 (Dec. 11, 2003).

Frank, C., et al., "Forecasting women's apparel sales using mathematical modeling," International Journal of Clothing Science and Technology, vol. 15, Issue 2, pp. 107-125 (2003).

Ryan, P., "Plug and Pay: A Gallery of 26 Mobile Card Readers," Aug. 20, 2013, Retrieved from the Internet URL: http://bankinnovation.net/2013/08/plug-and-pay-a-gallery-of-26-mobile-card-readers/, on Feb. 19, 2015, pp. 1-12.

"Uber-Android Apps on Google Play," dated Nov. 10, 2014, Retrieved from the Internet URL: https://play.google.com/store/apps/details?id=com.ubercab&hl=en, on Nov. 12, 2014, pp. 1-2.

Non-Final Office Action dated Sep. 10, 2015, for U.S. Appl. No. 14/032,585, of Bourget, E.W., filed Sep. 20, 2013.

Final Office Action dated Mar. 23, 2016, for U.S. Appl. No. 14/032,585, of Bourget, E.W., filed Sep. 20, 2013.

Non-Final Office Action dated Apr. 22, 2016, for U.S. Appl. No. 14/133,517, of Wolter, J., filed Dec. 18, 2013.

Non-Final Office Action dated Jul. 29, 2016, for U.S. Appl. No. 14/032,585, of Bourget, E.W., filed Sep. 20, 2013.

Non-Final Office Action dated Dec. 2, 2016, for U.S. Appl. No. 14/133,517, of Wolter, J., filed Dec. 18, 2013.

Notice of Allowance dated Jan. 27, 2017, for U.S. Appl. No. 14/032,585, of Bourget, E.W., filed Sep. 20, 2013.

Non-Final Office Action dated Jun. 7, 2017, for U.S. Appl. No. 14/529,687, of Lloyd, L.J., et al., filed Oct. 31, 2014.

Final Office Action dated Jun. 12, 2017, for U.S. Appl. No. 14/133,517, of Wolter, J., filed Dec. 18, 2013.

Non-Final Office Action dated Jul. 13, 2017, for U.S. Appl. No. 14/529,752, of Lloyd, L.J., et al., filed Oct. 31, 2014.

Non-Final Office Action dated Nov. 9, 2017, for U.S. Appl. No. 14/524,684 of Lloyd, L.J., et al., filed Oct. 27, 2014.

Non-Final Office Action dated Nov. 15, 2017, for U.S. Appl. No. 14/133,517, of Wolter, J., filed Dec. 18, 2013.

Final Office Action dated Jan. 10, 2018, for U.S. Appl. No. 14/529,687, of Lloyd, L.J., et al., filed Oct. 31, 2014.

Final Office Action dated Feb. 9, 2018, for U.S. Appl. No. 14/529,752, of Lloyd, L.J., et al., filed Oct. 31, 2014.

Final Office Action dated Apr. 10, 2018, for U.S. Appl. No. 14/524,684 of Lloyd, L.J., et al., filed Oct. 27, 2014.

Advisory Action dated May 3, 2018, for U.S. Appl. No. 14/529,752, of Lloyd, L.J., et al., filed Oct. 31, 2014.

(56) References Cited

OTHER PUBLICATIONS

Final Office Action dated May 14, 2018, for U.S. Appl. No. 14/133,517, of Wolter, J., filed Dec. 18, 2013.
Advisory Action dated Jun. 18, 2018, for U.S. Appl. No. 14/524,684 of Lloyd, L.J., et al., filed Oct. 27, 2014.
Non-Final Office Action dated Jul. 13, 2018, for U.S. Appl. No. 14/529,752, of Lloyd, L.J., et al., filed Oct. 31, 2014.
Notice of Allowance dated Jul. 20, 2018, for U.S. Appl. No. 14/524,684 of Lloyd, L.J., et al., filed Oct. 27, 2014.
Non-Final Office Action dated Dec. 3, 2018, for U.S. Appl. No. 14/529,687, of Lloyd, L.J., et al., filed Oct. 31, 2014.
International Search Report and Written Opinion, for International Application No. PCT/US2014/067074, dated Mar. 10, 2015.
Brown R.L., "Strategies for Successfully Buying or Selling a Business," The Business Book Press, RDS Associates Inc, 222 pages (2002).
Final Office Action dated Jun. 26, 2019, for U.S. Appl. No. 14/529,687, of Lloyd, L.J., et al., filed Oct. 31, 2014.
Final Office Action dated Jun. 26, 2019, for U.S. Appl. No. 16/177,068, of Grodin, S., et al., filed Oct. 31, 2018.
Non Final Office Action dated Sep. 12, 2019, for U.S. Appl. No. 15/789,678, of Cziraky-Stanley, C., et al., filed Oct. 20, 2017.
Advisory Action dated Sep. 16, 2019, for U.S. Appl. No. 14/529,687, of Lloyd, L.J., et al., filed Oct. 31, 2014.
Final Office Action dated Feb. 8, 2019, for U.S. Appl. No. 14/529,752, of Lloyd, L.J., et al., filed Oct. 31, 2014.
Non Final Office Action dated Mar. 14, 2019, for U.S. Appl. No. 16/177,068, of Grodin, S., et al., filed Oct. 31, 2018.
Final Office Action dated Mar. 9, 2020, for U.S. Appl. No. 15/789,678, of Cziraky-Stanley, C., et al., filed Oct. 20, 2017.
Final Office Action dated Mar. 9, 2020, for U.S. Appl. No. 16/177,068, of Grodin, S., et al., filed Oct. 31, 2018.
Advisory Action dated May 19, 2020, for U.S. Appl. No. 16/177,068, of Grodin, S., et al., filed Oct. 31, 2018.
Advisory Action dated Jun. 15, 2020, for U.S. Appl. No. 15/789,678, of Cziraky-Stanley, C., et al., filed Oct. 20, 2017.

* cited by examiner

DETECTION AND EXPLANATION OF LIFTS IN MERCHANT DATA

RELATED APPLICATIONS

This application claims priority to and is a continuation of U.S. patent application Ser. No. 14/524,684, filed on Oct. 27, 2014, the entire contents of which are incorporated herein by reference.

BACKGROUND

Merchant sales, profits, and other indicators of merchant performance are often affected by various trends, events and business practices, widely ranging from employee performance to local weather patterns. However, merchants may have very little access to information identifying inexplicable and/or unpredictable variations in their performance, and even less access to explanations of the variations and/or recommendations for addressing these variations. Further, a merchant's inability to identify inexplicable and/or unpredictable variations in the merchant's own performance may be further compounded by limited access to information about other merchants. For example, merchants may not have access to much information about other merchants within a shared geographic region or merchants offering similar items for sale. Accordingly, it can sometimes be difficult for merchants to obtain sufficient information for growing and improving their businesses.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
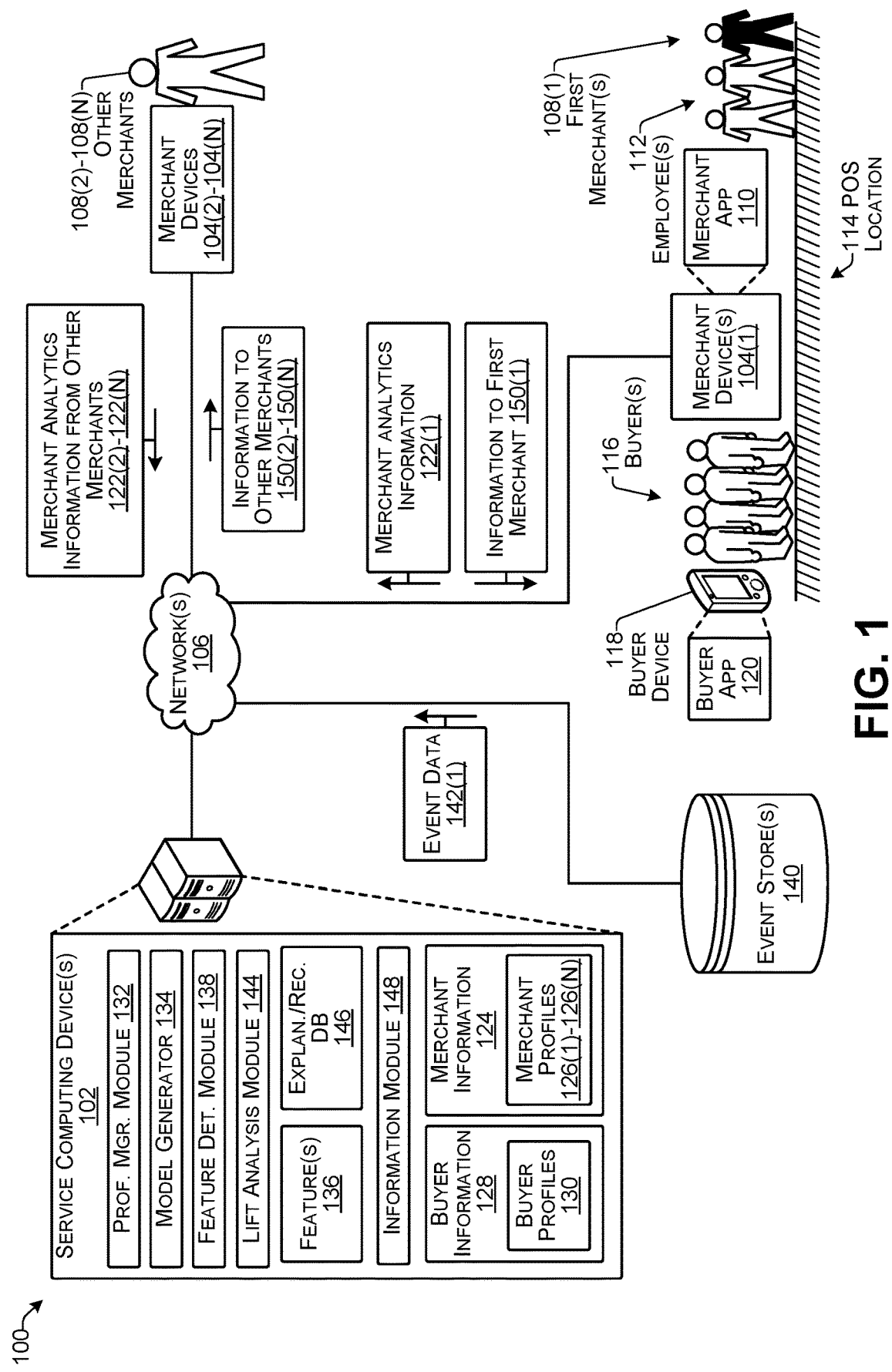
FIG. 1 illustrates an example environment for a payment and information service according to some implementations.

Some implementations described herein include techniques and arrangements for identifying and explaining lifts in merchant data. As used herein, a lift may include a positive or negative deviation by merchant data from a model representing expected or otherwise predicted values for the merchant data. In other words, a lift may represent a residual of the merchant data with respect to merchant data predicted by the model.

A service provider may receive merchant analytics information from a plurality of merchant devices, and may associate the merchant analytics information with particular merchant profiles. For instance, the service provider may associate merchant analytic information received from a plurality of merchant devices to a merchant profile of a merchant associated with the plurality of merchant devices. In some examples, the merchant analytics information may include transaction information, gross sales, product inventory, customer data, foot traffic data, employee performance, employee scheduling, product return information, shelf space allocation, marketing expenses, marketing promotions, conversion rate, etc. As used herein, a transaction may include a financial transaction for the acquisition of goods and/or services (referred to herein as items) that is conducted between a buyer (e.g., a customer) and a merchant, such as at a point of sale ("POS") location. During a transaction, the merchant device can determine merchant analytics information related to the transaction, such as the amount of payment received from a buyer, the item(s) acquired by the buyer, a time, place and date of the transaction, placement of the item within the merchant location, associated marketing promotions, one or more employees associated with the transaction, and so forth.

The service provider may further aggregate and segment merchant profiles into merchant categories, e.g., groups of merchant profiles that share certain characteristics. For example, the service provider can create subsets of merchant profiles based on various merchant information including, for example, geographic region, items offered for sale, merchant category code ("MCC"), customer demographic, business size, and so forth.

Further, the service provider may generate a merchant specific time series model for a merchant profile based at least in part on the merchant analytics information. In some instances, the model may represent a metric included in the merchant analytics information. For example, the model may represent expected sales of an item by a merchant during a period of time. Further, the generated models may provide predictions of a metric at varying levels of scope. For example, a model may represent sales predictions for a particular item, sales predictions for a particular merchant location, sales predictions for a group of merchant locations in a geographic area, and so forth.

In addition, individual models may incorporate a set of core features for predicting the metric represented by the model. In some examples, the core features may include the day of the week, historic sales data, seasonality, local weather, economic health, local events, etc. Further, the core features incorporated into the model may be based in part on one or more merchant categories associated with the merchant profile. For instance, the cores features incorporated into the model may be based upon the geographic region of the merchant or items offered for sale by the merchant.

Further, the service provider may generate a category specific time series model for a subset of merchant profiles based at least in part on aggregated merchant analytics information associated with a plurality of merchant profiles associated with a merchant category. In addition, the service provider may generate a weighted combination of a merchant specific model and a category specific model for use as a forecast model.

The service provider may compare a forecast model (e.g., a merchant specific model predicting values of a metric, a weighted model predicting values of a metric, etc) to the observed values of the metric, and detect lifts between the forecast model and the observed values. In some examples, detecting lifts may include indentifying statistically significant deviations between a data point of the prediction model and a corresponding data point of the observed values at the same time interval. For example, the service provider may compare sales predictions of a model for a merchant to actual sales by the merchant, and detect a residual of the actual sales with respect to the sales predictions that is larger than a predetermined threshold.

The service provider may further identify potential factors contributing to the presence of the lift by iteratively adding and removing features from the forecast model, and determining the disappearance of the lift or a reduction in the residual value associated with the lift based in part on the addition or removal of a feature. For example, a detected lift may be reduced in response to the service provider adding a feature to the model representing the occurrence of an event in close proximity to the merchant. In response, the service provider may incorporate the feature representing the event into the model when providing one or more forecast values. In addition, the service provider may incorporate the feature representing the event into models associated with merchant profiles belonging to the same merchant categories as the merchant profile. For example, the service provider may add the feature to a merchant specific model associated with the merchant profile of a business next door to the merchant.

In some cases, once the service provider has determined a correlation between a feature and a lift, the service provider may provide the merchant with an explanation of the lift and/or a recommendation for managing the effects of the lift. For example, the service provider may detect a lift associated with features representing the merchant's winter coat inventory and local weather patterns within the merchant's geographic location, respectively. In response, the service provider may explain that due to low inventory of winter coats a merchant was unable to capitalize on a coldwave experienced in the merchant's geographic location. Further, the service provider may recommend that in light of an expected repeat coldwave the following year, the merchant should stock a higher inventory of winter coats prior to the occurrence of the coldwave the following year. In some cases, the recommendations may include permanently expanding the business, opening new stores, hiring employees, staffing the business, stocking the inventory, changing hours of operation, and so forth.

For discussion purposes, some example implementations are described in the environment of a service computing device that detects and explains lifts in merchant data. However, implementations herein are not limited to the particular examples provided, and may be extended to other environments, other system architectures, and so forth, as will be apparent to those of skill in the art in light of the disclosure herein.

FIG. 1 illustrates an example environment 100 for a payment and information service according to some implementations. For instance, the environment 100 may enable a service provider to receive merchant analytics information for merchant locations, and associate the merchant analytics information with related merchants. Based at least in part on analysis of the merchant analytics information, the service provider may provide various personalized explanations, recommendations and predictions to the merchants, such as to assist the merchants in optimizing and improving their businesses.

In the illustrated example, one or more service computing devices 102 of the service provider are able to communicate with one or more merchant devices 104 over one or more networks 106. Each merchant device 104 may be associated with a respective merchant 108. For example, one or more first merchant devices 104(1) may be associated with a first merchant 108(1). Further, other merchant devices 104(2)-104(N) may be associated with other merchants 108(2)-108(N).

Each merchant device 104 may include an instance of a merchant application 110 that executes on a respective merchant device 104. The merchant application 110 may provide POS functionality to the merchant device 104 to enable the merchant 108 and/or employees 112 of the merchant to accept payments from buyers 116 at one or more POS locations 114. In some types of businesses, a POS location may correspond to a store or other place of business of the merchant, and thus, may be a fixed location that typically does not change on a day-to-day basis. In other types of businesses, however, the POS location may change from time to time, such as in the case that the merchant operates a food truck, is a street vendor, a cab driver, or has an otherwise mobile business, e.g., in the case of merchants who sell items at buyers' homes, buyers' places of business, and so forth.

As used herein, a merchant may include any business or other entity engaged in the offering of goods or services for acquisition by buyers in exchange for compensation received from the buyers. Actions attributed to a merchant herein may include actions performed by employees or other agents of the merchant and, thus, no distinction is made herein between merchants and their employees unless specifically discussed. In addition, as used herein, a buyer may include any entity that acquires goods or services from a merchant, such as by purchasing, renting, leasing, borrowing, licensing, or the like. Buyers may be customers or potential customers of a particular merchant. Hereinafter, goods and/or services offered by merchants may be referred to as items. Thus, a merchant and a buyer may interact with each other to conduct a transaction in which the buyer acquires one or more items from a merchant, and in return, the buyer provides payment to the merchant.

In some examples, a buyer 116 may have a buyer device 118 that may execute a buyer application 120. For instance, some buyers 116 may carry buyer devices 118, such as smart phones, tablet computers, wearable computing devices, or the like, as further enumerated elsewhere herein, and some of these buyer devices 118 may have installed thereon the buyer application 120. The buyer application 120 may include electronic payment capability, which enables the buyer 116 to make a payment to the merchant using the buyer application 120, rather than paying with a physical payment card, cash, check, or other payment instrument. The buyer application 120 may further enable the buyer 116 to check in with the particular merchant, e.g., at the merchant's store or prior to entering the merchant's store. For instance, the buyer application 120 may be able to send a notification that the buyer has visited the POS location 114.

As an example, the merchant 108(1) and the buyer 116 may conduct a transaction by which the buyer 116 acquires an item from the merchant 108(1) at the POS location 114. In response, the merchant application 110 on the first merchant device 104(1) may send merchant analytics information 122(1), including transaction information, to the service computing device 102. The merchant analytics information 122 may include information regarding the time, place, and the amount of the transaction, an itemized listing of the items being acquired, the price being paid for each item, descriptors of the items (size, flavor, color, etc.), geolocation data indicating a geographic POS location of the transaction, a type of payment instrument being used (e.g., cash, check, payment card, electronic payment), as well as additional information, such as buyer information.

As another example, the merchant device 104(1) may track buyers that visit the POS location 114. In response, the merchant application 110 on the first merchant device 104(1) may send merchant analytics information 122(1) including foot traffic data and buyer data to the service computing device 102. The merchant analytics information 122 may include the number of buyers that visited the POS location 114 during a period of time, information regarding the time, place, and the duration of visits by individual buyers 116, demographic information of the individual buyers 116, the employees 112 that an individual buyer 116 interacted with during a visit, as well as additional information, such as locations within the POS location 114 visited by individual buyers 116, and so forth.

The service computing device 102 may also receive merchant analytics information 122(2)-122(N) from plurality of other merchants 108(2)-108(N), respectively. For example, a large number of merchants 108(2)-108(N) may also operate their own merchant devices 104(2)-104(N), respectively, for conducting transactions with respect to their own businesses. Accordingly, merchant analytics information 122(2)-122(N) from the plurality of other merchant devices 104(2)-104(N), respectively, may also be provided to the service computing device 102.

As discussed additionally below, the service computing device 102 may receive the merchant analytics information 122 and may associate the merchant analytics information 122 with merchant information 124 maintained by the service computing device 102. For example, the first merchant analytics information 122(1) may be associated with a first merchant profile 126(1) corresponding to the first merchant 108(1), the Nth merchant analytics information 122(N) may be associated with an Nth merchant profile 126(N) corresponding to an Nth merchant 108(N), and so forth.

In addition, buyer information 128 may be extracted from the merchant analytics information 122 and may be associated with respective buyer profiles 130. As one example, the merchant analytics information 122 may include a name associated with a buyer that visited the POS location 114. Accordingly, a buyer profile 130 may be associated with the name associated with the buyer that visited the POS location 114. Additional information may be related to this buyer profile 130, such as the merchant identifier, the POS location of the visit, the time and date of the visit, and the duration of the visit, and so forth.

The buyer profiles 130 and/or merchant profiles 126 described herein may be created and maintained using any suitable types of data structures, and using any suitable data storage or database techniques. In some examples, the transaction information and other profile information may be maintained in a relational database in which pieces of information for individual buyer profiles and merchant profiles may be stored distinctly from one another, but are related to or otherwise associated with each other in the relational database. For instance, a particular merchant profile 126 may be obtained by generating a view of a portion of the data related in the database to the particular merchant profile, or by otherwise extracting the data from the database. Alternatively, of course, other types of storage techniques may be used for generating and maintaining the buyer profiles 130 and/or the merchant profiles 126.

In the illustrated example, the service computing device 102 includes a profile management module 132. The profile management module 132 may receive the merchant analytics information 122 and associate the merchant analytics information 122 with particular merchant profiles 126 and particular buyer profiles 130. In some examples, the profile management module 132 may compare received merchant analytics information 122, which may include an identifier of the merchant device 104 or an identifier of an instance of a merchant application 110 from which the merchant analytics information 122 is received for associating the merchant analytics information 122 with a particular merchant profile 126. Furthermore, the merchant analytics information 130 may extract buyer information such as credit card identifier, buyer name, buyer email address, and various other pieces of buyer information from the merchant analytics information 122, and may match this information with an existing buyer profile 130. If no match is found, then a new buyer profile 130 may be created.

Additionally, the profile management module 132 may group merchant profiles into merchant categories based in part on similar and/or shared characteristics amongst the merchant profiles 124. In some examples, the profile management module 132 may group merchant profiles by geographic region, items offered for sale, industry, customer demographic, customer base, business size, etc.

For instance, the profile management module 132 may group merchant profiles 126 by industry based in part on the merchants' 108 self-declared business category or using merchant category codes (MCC). The MCC is a four-digit number assigned to a business by credit card companies (e.g., American Express®, MasterCard®, VISA®) when the business first starts accepting payment cards as a form of payment. The MCC is used to classify the business by the type of goods or services provided by the business.

Similarly, the merchants (and buyers) may be classified into location categories, such as for particular categories of geographic regions, e.g., same street, same neighborhood, same postal code, same district of a city, same city, and so forth. The location categories may be determined based on the location(s) at which the respective merchant conducts POS transactions, such as may be determined from GPS information, the address of the merchant, network access points, cell towers, and so forth. Further, a merchant may be categorized into several different location categories, such as a particular street, particular neighborhood, particular district, particular city, etc. In addition, the location categories need not all necessarily relate to the same geographic region. For example, an airport bar in San Francisco and an airport bar in Washington D.C. might be associated with the same location category, i.e., being located in an airport. Thus, the location categories may include categories for defined physical areas, such as airports, malls, stadiums, farmer's markets, and so forth. Alternatively, of course, other location-based techniques may be used for determining merchants and/or buyers in the same geographic region or within proximity to one another, etc., such as radial distance from a reference location, or the like. In some other examples, the profile management module 132 may employ segmenting methods, such as collaborative filtering, clustering, profiling, data mining, text analytics, etc, to group the merchant profiles 126 into merchant categories.

As illustrated in FIG. 1, the service computing device 102 includes a model generator 134 and features 136. The model generator 134 may train time series models that predict merchant metrics based on information included in the merchant analytics information 122. In addition, the model generator 134 may periodically update and re-train the model based on new training data to keep the model up to date. As used herein, the term metrics includes business measurements such as business numbers and/or measurements of merchant activity or merchant operations. Illustratively, examples of metrics may include gross revenue, gross profit, item sales, inventory turnover, foot traffic, buyer profitability, return on capital invested, sales per square foot, visit to buy ratio, wage cost, cost of goods sold, inventory value, inventory turnover, taxes owed, customer retention, customer satisfaction, incremental sales, average purchase value, point of purchase, etc.

Further, the model generator 134 may incorporate one or more core features 136 into individual models. As used herein, features 136 may include one or more variables that may have an effect on the metric represented by a model. As an example, features 136 may represent seasonality, geographic region, weather, day of the week, type or category of merchant, calendar events, customer demographic, and economic health, such as employment statistics, housing data, gross domestic product, money supply, consumer price index, producer price index, S&P 500 Stock Index, consumer confidence, etc.

In some examples, the model generator 134 may employ linear regression to build a regression model using the features 136. Further, the model generator 134 may determine the regression weight for each feature 136 with respect to an individual regression model. For instance, the model generator 134 may use a penalized linear regression, such as least-angle regression ("LARS") or least absolute shrinkage and selection operator ("LASSO"), to reduce the contribution of features 136 regarded as inconsequential to the model. Examples of other suitable models may include stochastic models, such as Markov models, hidden Markov models, and so forth.

As illustrated in FIG. 1, the service computing device 102 includes a feature detection module 138 and one or more event stores 140. The feature detection module 138 may detect prospective features based in part on event data 142 received from the event store 140, and store information associated with the prospective features as features 136. The event store(s) 140 may contain information including weather data, informational sources (e.g., news articles, blog entries, web content, press releases), economic data, financial data, calendars, and so forth. As an example, the feature detection module 138 may receive a calendar of religious holidays from the event store 140, and generate a feature representing the calendar. As another example, the feature detection module 138 may implement machine learning techniques to detect a business trend from a plurality of press releases received from the event store. Additionally, the feature detection module 138 may generate a feature representing the business trend, and store the generated feature as a feature 136. In some instances, the feature detection module may further confirm a detected feature via human or automated analysis of merchant information 124.

In the illustrated example, the service computing device 102 includes a lift analysis module 144, an explanation/recommendation database 146, and an information module 148. The lift analysis module 144 may compare observed values of a metric to predicted metric values output by a generated model, and determine the presence of one or more residuals relative to the model output. The lift analysis module 144 may further determine that the one or more residuals constitute lifts by determining whether the residuals are statistically significant. For example, the lift analysis module 144 may determine that the residual constitutes a lift based in part on the value of the residual exceeding a predetermined threshold. Further, the lift analysis module 144 may iteratively add one or more features to the model, and determine whether the addition of the feature has reduced or removed a lift.

Figure 7:
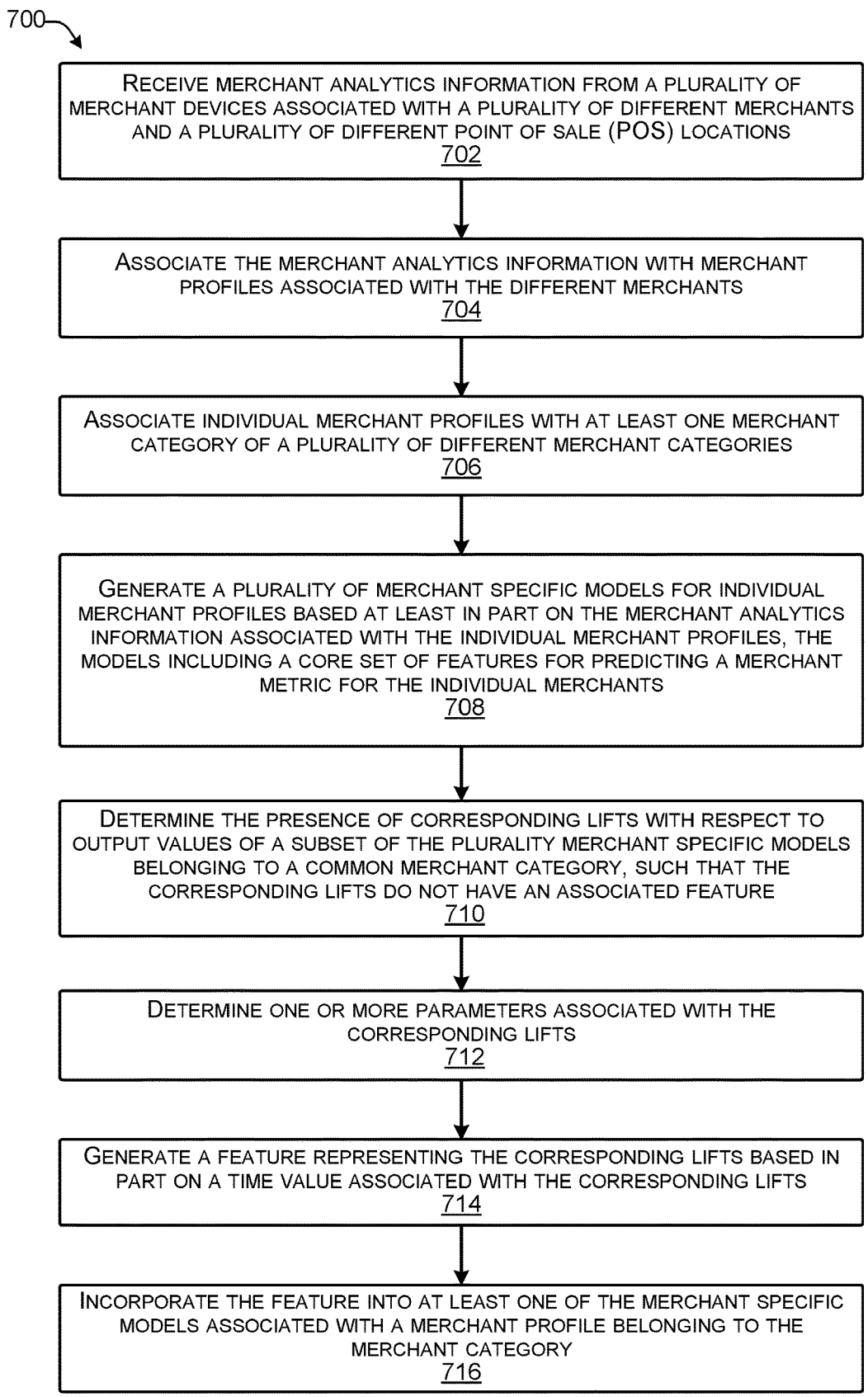
FIG. 7 is a flow diagram illustrating an example process for detecting a feature based in part on determining the existence of a lift.

When the lift analysis module 144 cannot identify a feature that corresponds to the lift, the feature detection module 138 may generate an unexplained feature as described in FIG. 7. However, when the lift analysis module 144 identifies that one or more features correspond to a lift, the information module 148 may add the identified features to the model and/or related models, and provide explanations, recommendations, and forecast values based in part on the features. Additionally, the information module 148 may determine the degree to which the features incorporated into a model inform the model at any given time interval. For instance, the information module 148 may approximate the degree to which a feature contributes to the model based in part on a calculation of the proportion of variance explained by the feature. In other words, the information module 148 may measure the effect of a feature on the model by determining the proportion of the variance amongst expected values attributable to the feature. In some examples, the information module 148 may further rank the features according to the degree by which they contribute to the model. For instance, the information module 148 may inform a user that during the holiday season, a feature representing local holiday sales contributes more to a sales estimate than a feature representing sales from the previous month.

In addition, the information module 148 may identify one or more explanations and/or recommendations, within the explanation/recommendation database 146, that are associated with the one or more features incorporated into a model. Further, the information module 148 may rank the explanations and/or recommendations based at least in part on the ranking of the related feature amongst the features that inform the model.

Further, the information module 148 may provide a model, metric predictions based on the model, an explanation of a lift detected with respect to the model, and/or a recommendation associated with the detected lift as information 150 to a merchant device 104. In some cases, the merchant device 104 may present the information 150(1) on a display (not shown in FIG. 1) associated with the merchant device 104(1). Further, the merchant device 104 may recompute the model with one or more features added or removed from the model, and the merchant device 104 may further determine updated predicted values based in part on the recomputed model.

Figure 2:
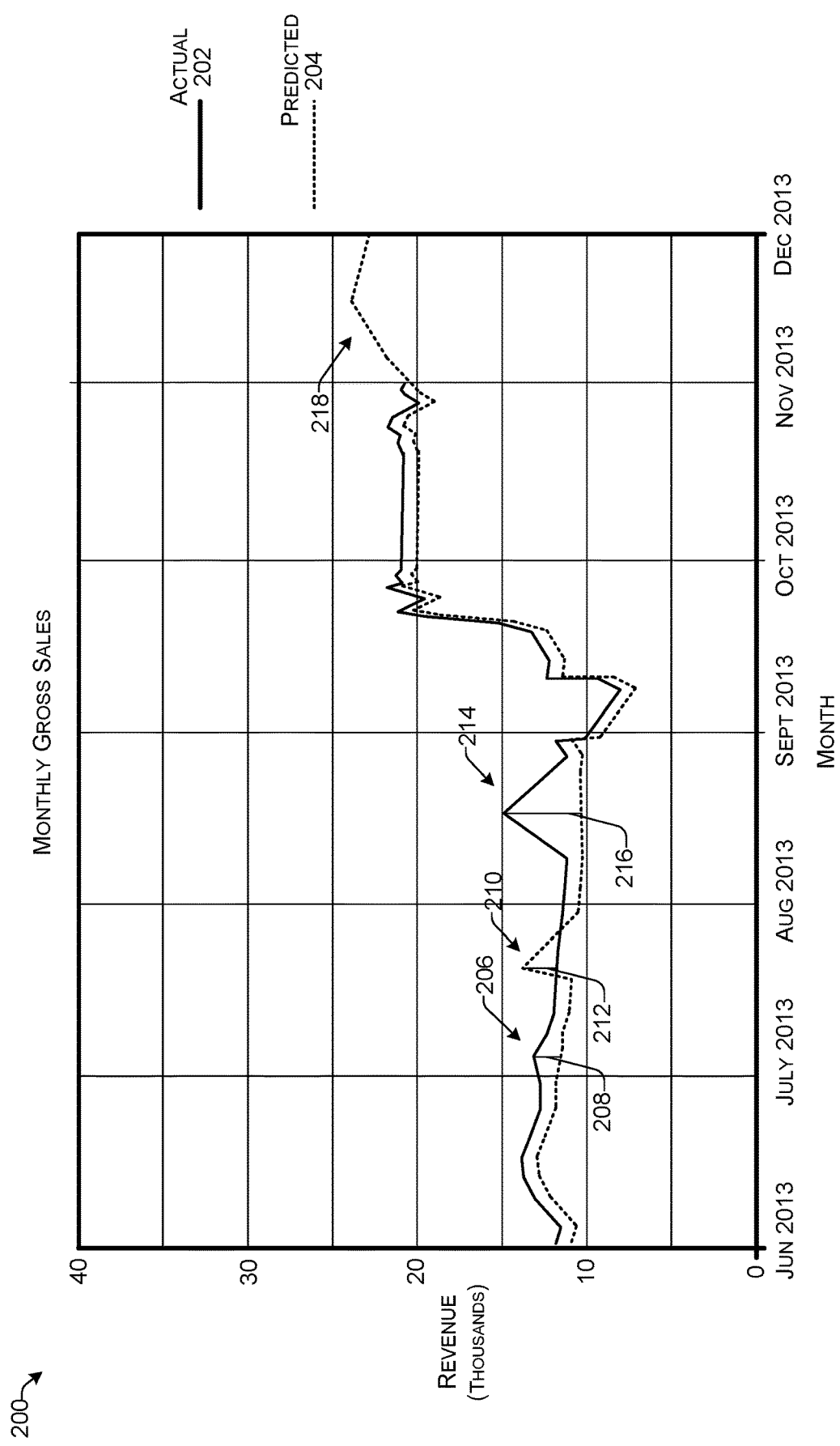
FIG. 2 is an example graph illustrating a comparison between predicted monthly gross sales output by a model and observed monthly gross sales according to some implementations.

FIG. 2 illustrates an example graph 200 showing a plurality of lifts detected in merchant data according to some implementations. Accordingly, the graph 200 illustrates a time series of actual monthly gross sales 202 and a time series of predicted monthly gross sales 204 for the merchant 108 (not shown in FIG. 2) as predicted by a linear regression model generated in accordance with the methods described herein.

At 206, the graph 200 illustrates a first residual 208 of the actual monthly gross sales 202 with respect to predicted gross sales 204 predicted by the linear regression model. Further, the lift analysis module 144 (not shown in FIG. 2) may determine that the first residual 208 is not statistically significant based in part on the value of the first residual 208 being less than a specified threshold.

At 210, the graph 200 illustrates a second residual 212 of the actual monthly gross sales 202 with respect to the predicted gross sales 204 predicted by the linear regression model. Further, the lift analysis module 144 may determine that second residual 212 is a lift based in part on the value of the residual 212 being greater than a specified threshold. Further, at 210, the second residual 212 may constitute a negative lift, as the value of the actual gross sales 202 is less than the predicted gross sales 204 provided by the linear regression model.

At 214, the graph 200 illustrates a third residual 216 in the actual monthly gross sales 202 with respect to the predicted gross sales 204 predicted by the linear regression model. In some examples, the lift analysis module 144 may determine that the third residual 216 is a lift based in part on a value of the residual being greater than a specified threshold. Further, at 214, the third residual 216 may constitute a positive lift, as the value of the actual gross sales 202 is greater than the predicted gross sales 204 provided by the linear regression model. At 218, the graph 200 illustrates a forecast of the monthly gross sales 204 during the month of November according to the linear regression model. In some examples, the graph 200 may be included in the information 150 (not shown in FIG. 2) provided to the merchant 108.

Figures 3A, 3B:
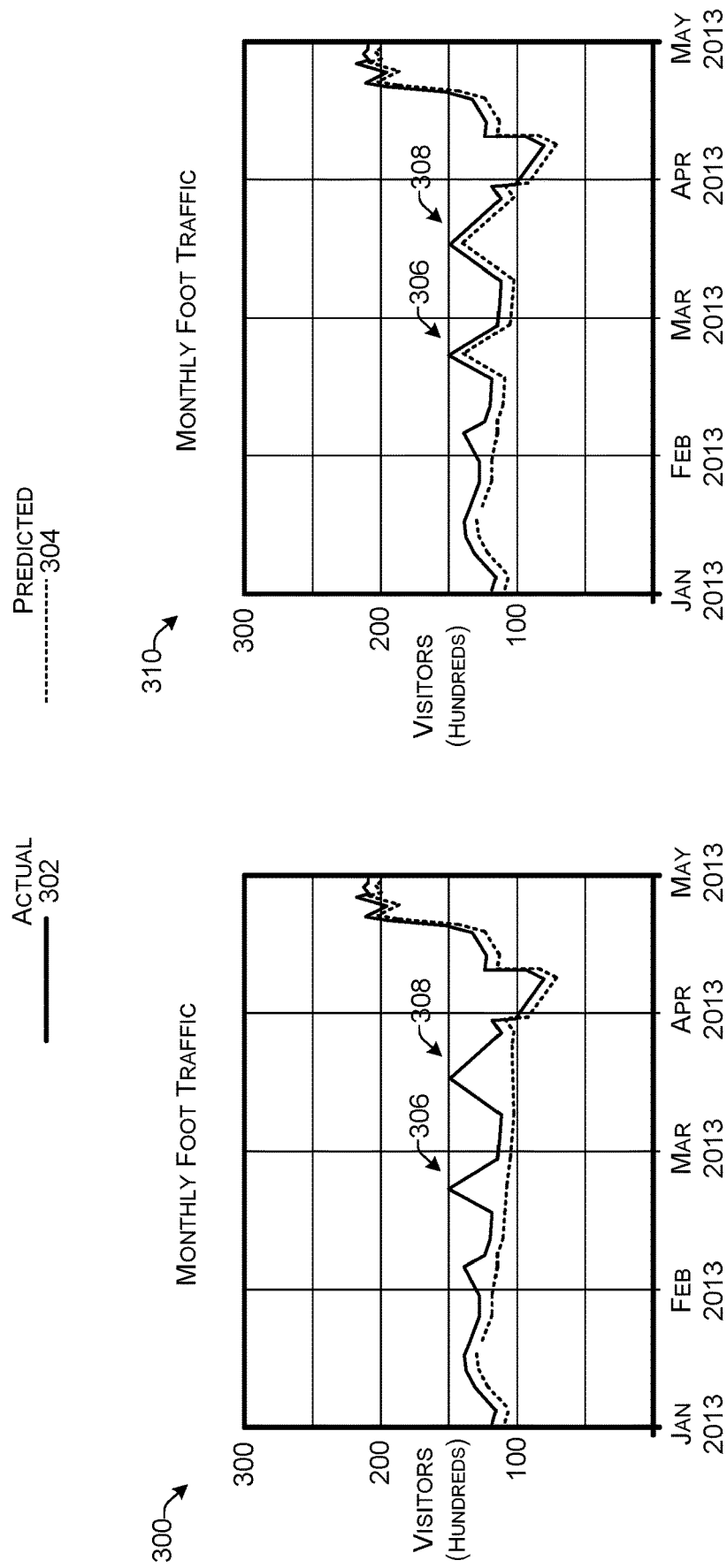
FIGS. 3A and 3B are example graphs illustrating a comparison between predicted monthly foot traffic output by a model and observed monthly foot traffic according to some implementations.

FIG. 3A illustrates an example graph 300 showing a plurality of lifts from merchant data according to some implementations. Accordingly, the graph 300 illustrates a time series of actual monthly foot traffic 302 and a time series of predicted monthly foot traffic 304 for a merchant as predicted by a linear regression model. For example, the actual monthly foot traffic data may represent foot traffic information collected by the merchant app 110 (not shown in FIG. 2) of the merchant device 104 (not shown in FIG. 2) at a convenience store location 114 (not shown in FIG. 2) operated by the merchant 108 (not shown in FIG. 2). Further, the linear regression model may be generated by the model generator 132 (not shown in FIG. 2) based in part on merchant analytics information 122 (not shown in FIG. 2) included in the merchant profile 126 (not shown in FIG. 2) associated with the convenience store merchant 108.

At 306, the graph 300 illustrates a first lift in the actual foot traffic data 302 with respect to the predicted foot traffic data 304 for a location of the merchant. More specifically, at 302, the graph 300 displays that the actual foot traffic data 302 was greater than predicted foot traffic data 304. At 308, the graph 300 illustrates a second lift in the actual foot traffic with respect to predicted foot traffic 304. More specifically, at 308, the graph 300 displays at 308 that the actual foot traffic data was greater than predicted foot traffic data 304. As illustrated in the graph 300, the lifts 306 and 308 occur towards the end of February and March, respectively.

FIG. 3B illustrates an example graph 310 showing the removal of the plurality of lifts from merchant data based in part on the addition of a feature 136 (not shown in FIG. 3B) to the model according to some implementations described herein. Accordingly, the graph 310 illustrates a time series of actual monthly foot traffic 302 at a merchant location and a time series of predicted monthly foot traffic 304. In FIG. 3B, the linear regression model has been re-computed to incorporate the feature 136. As a result, the lifts 306 and 308 that were present in FIG. 3A have been reduced.

As an example, the convenience store location 114 may be in close proximity to a basketball gym that hosts weeklong basketball tournaments during the months of February and March. Further, the linear regression model may be recomputed to incorporate a feature 146 that informs the model of the date and time of the basketball games of the tournament, and an increase in foot traffic experienced by merchants in close proximity to the basketball gym during game days. As a result, the recomputed model may output foot traffic predictions that better correspond to the actual foot traffic data, thereby reducing the residual values corresponding to the lifts at 306 and 308, respectively. In some examples, the reduction of the residual values corresponding to the lifts 306 and 308 below a threshold amount, respectively, may indicate that the service provider may use the feature 136 to forecast foot traffic data for the merchant and/or merchants having similar characteristics.

Figure 4:
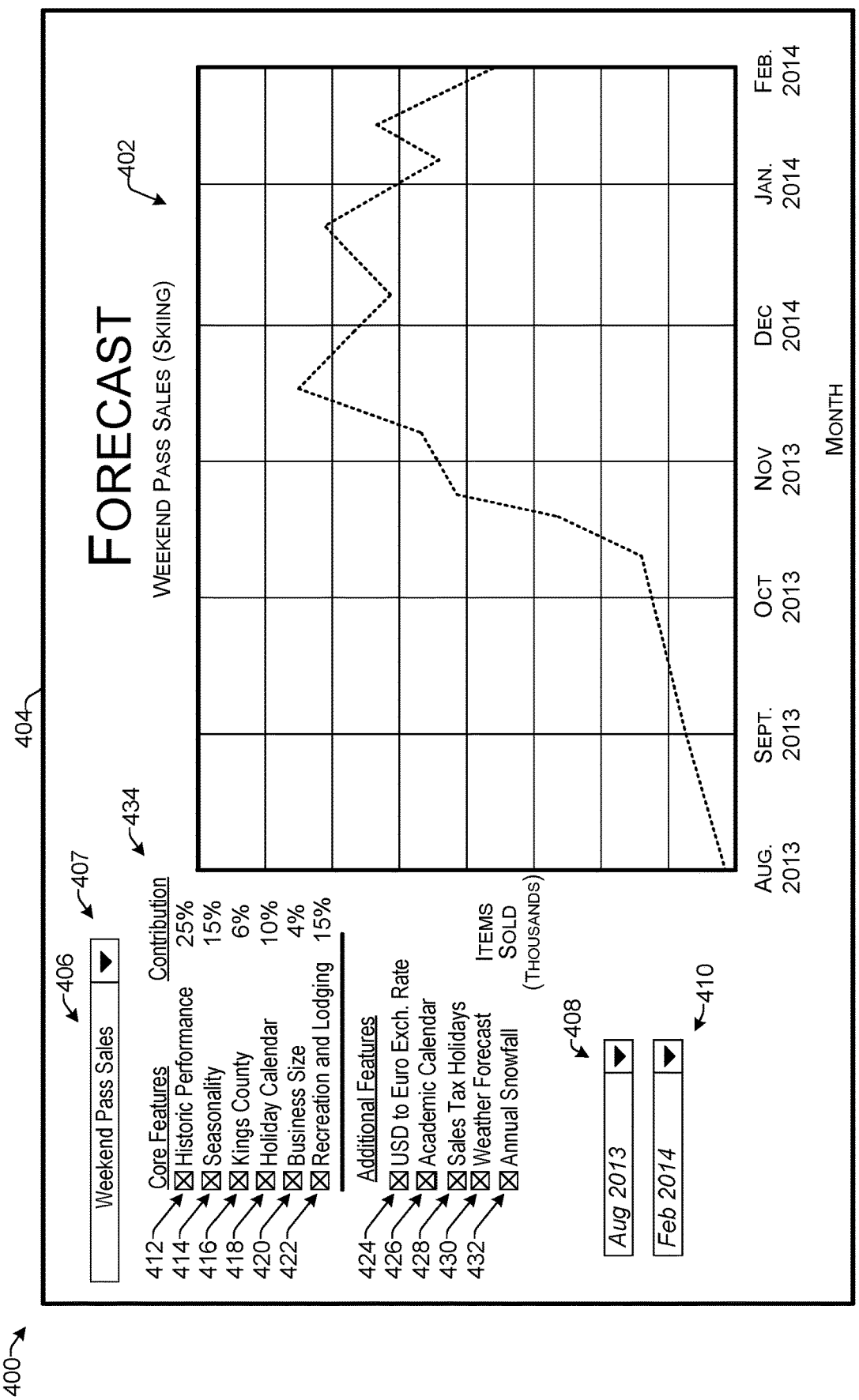
FIG. 4 illustrates an example interface for presenting information to a merchant according to some implementations.

FIG. 4 illustrates an example graphical user interface 400 for presenting forecast data to a merchant according to some implementations. For example, a forecast 402 may be presented on a display 404 associated with a merchant device or may be presented to the merchant using any other suitable communication technology. As described above, the information module 148 can provide a time series forecast 402 for a merchant metric i.e., weekend pass sales 406 using a model generated by the model generator 134 to provide the merchant with insight for improving their businesses. For example, the model generator 134 may build a model for predicting monthly sales of weekend ski passes by a merchant operating a Ski Resort. FIG. 4 further illustrates that the merchant user may select various different metrics to be forecast in the display 404 using a drop down list 407.

In the illustrated example, the graphical interface 400 or any of the other interfaces discussed herein may include the ability for the merchant to select a period of time for which to view predicted values of the selected metric 406 via the forecast 402. For example, the merchant may select a time period for which to display forecast metric values by specifying a range between a start date 408 and an end date 410.

Further, the graphical interface 400 may display one or more features 416-432 incorporated into the model that output the time series forecast 402. Furthermore, the merchant may modify the forecast 402 by altering the features 416-432 incorporated into the model that output the forecast 402. As one example, the user may select or deselect a feature in the list of features 416-432 such as by tapping, double clicking, or the like, to have that feature added or removed from the model. For instance, when the user selects or deselects a feature, the user interface 400 may send a communication to the service computing device, which may respectively add or remove the feature from the model to generate a revised time series forecast. The revised time series forecast is subsequently received and presented by the merchant device in the interface 400.

Further, in some examples, the interface 400 may display values 434 representing the contribution of individual feature to the model at a specified point in time for individual features 416-432. Several examples of features may include historic performance 416, seasonality 414, merchant location 416, a calendar of holidays 418, merchant business size 420, merchant business category 422, exchange rate 424, a calendar of academic events, a calendar of sales tax holidays, a weather forecast, and forecast of annual snowfall. Further, the graphical user interface may delineate between core features 412-422 and non-core features 424-432. Additionally, the selectable options, controls and features displayed in the interfaces herein, such as for selecting metrics, selecting time periods, selecting features, and the like, may be included in any of the interfaces discussed herein, and are not limited to the specific examples illustrated.

Figure 5:
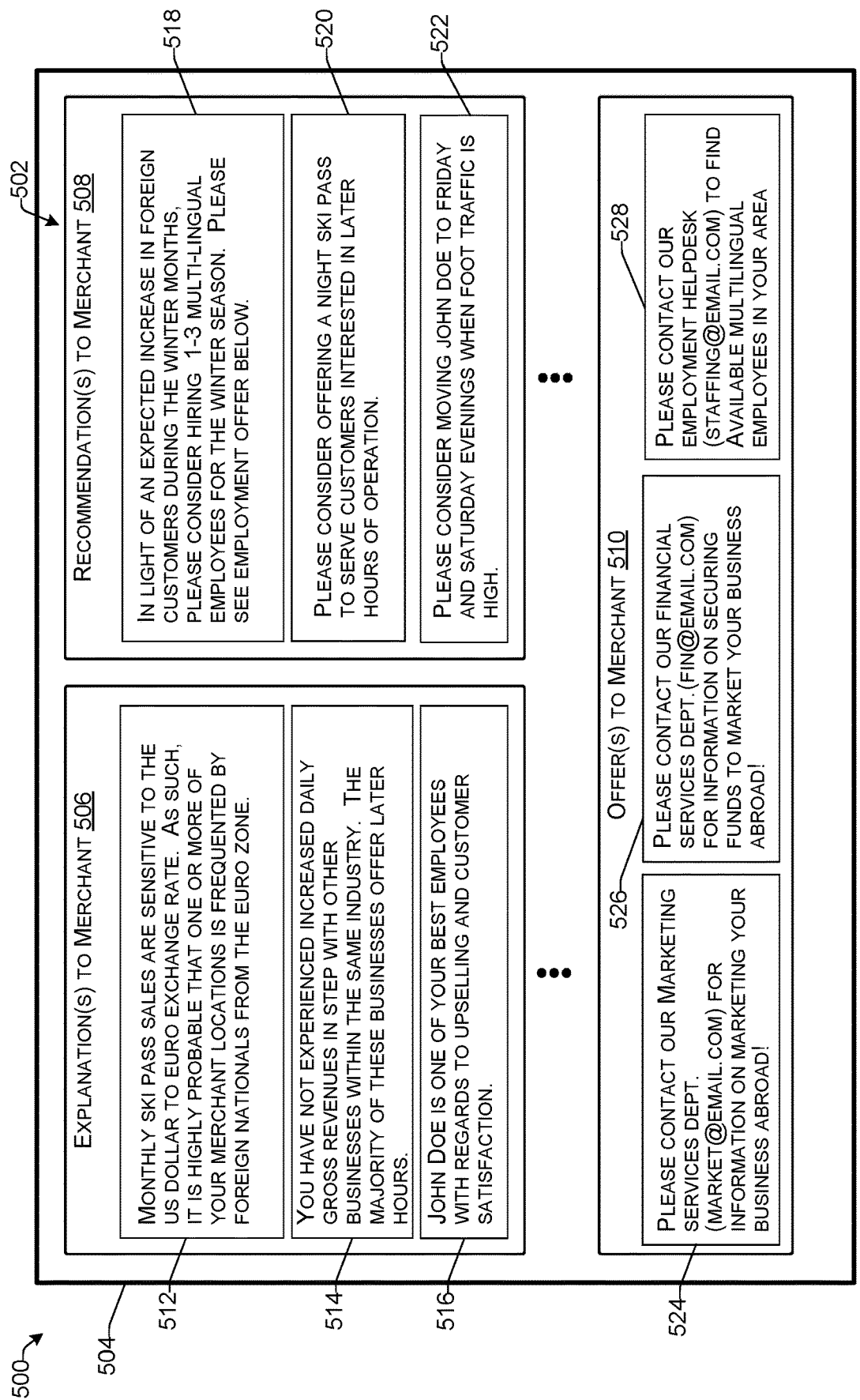
FIG. 5 illustrates an example interface for presenting information to a merchant according to some implementations.

FIG. 5 illustrates an example graphical interface 500 for presenting explanations, recommendations and/or other information to a merchant according to some implementations. For example, merchant information 502 may be presented on a display 504 associated with a merchant device or may be presented to the merchant using any other suitable communication technology. As described above, the information module 148 (not shown in FIG. 5) can detect lifts in observed merchant data with respect to predicted merchant data to provide merchants with personalized explanations for past business results, and personalized recommendations and offers for improving their businesses in the future.

In the illustrated example, the graphical interface 500 presents the merchant information 502 that applies to the particular merchant 108-1 (not shown in FIG. 5). In this example, the merchant information 502 includes explanations 506 of detected lifts and corresponding features, recommendations 508 for managing the detecting lifts and features; and offers 510 for services by the service provider that may aid the merchant 108-1 in accomplishing one or more the recommendations 508. In some cases, the merchant information 502 may pop up or otherwise be presented on the display 504 as they are received. Additionally, and alternatively, the merchant information 502 may be viewed by a merchant at a later time, such as by accessing a dashboard, selecting a recommendation notification icon (not shown in FIG. 5), receiving an electronic communication (e.g., electronic mail), or the like.

The explanations 506 may be determined based on one or more lifts detected by the lift analysis module 144, and one or more features associated with the detected lifts. Examples of explanations include explanations 512, 514 and 516. For instance, with respect to explanation 512, the model generator 134 (not shown in FIG. 5) may build a model representing sales of ski weekend passes by a merchant 108 operating a ski resort 114. Further, the lift analysis module 144 (not shown in FIG. 5) may detect a positive lift associated with a feature that informs the model of the daily exchange rate from US Dollar to Euro. In response, the information module 148 on the service computing device may search the explanation database 146 for database items associated with the daily exchange rate from US Dollar to Euro. The information module 148 may further identify a database item that explains that customers from the Eurozone are known to travel to US vacation destinations when the Euro has a high value with respect to the US Dollar. Consequently, the information module 148 may generate the explanation 512 and send a communication including the explanation 512 to the merchant device 104-1 (not shown in FIG. 5), to notify the merchant 108 that of sensitivity of the merchant's business to the daily exchange rate from US Dollar to Euro.

For instance, with respect to the explanation 514, the model generator 134 may build a weighted model, including merchant information 122 (not shown in FIG. 5) associated with the merchant 108-1 and other merchants 108(N) in the same geographic region as the merchant 108-1, representing daily gross sales by the merchant 108-1 operating the ski resort 114. Further, the lift analysis module 144 may detect a negative lift associated with a feature that informs the model of the hours of operation of the merchant location 114 (not shown in FIG. 5). In response, the information module 148 on the service computing device may search the explanation database 146 (not shown in FIG. 5) for database items associated with the hours of operation of the store. The information module 148 may further identify a database item that explains that merchant location 114 is closing at a time when other merchants 108(N) in the same geographic location experience peak sales. Consequently, the information module 148 may generate the explanation 514 and send a communication including the explanation 514 to the merchant device 104-1, to notify the merchant that gross sales are lower than predicted due to premature closing hours.

For instance, with respect to the explanation 516, the model generator 134 may build a model representing the amount of daily transactions indicating an occurrence of upselling at the ski resort. Further, the lift analysis module 144 may detect a positive lift associated with a feature that informs the model of the employee schedule of an employee John Doe 112. For example, the positive lifts may be present during the business hours when John Doe 112 is present at the ski resort 114. In response, the information module 148 on the service computing device may search the explanation database 146 for database items associated with employee scheduling. The information module 148 may further identify a database item that explains that John Doe 112 positively contributes to increased instances of a customer additionally purchasing more expensive items, upgrades, or other add-ons (e.g., extended warranty and/or insurance for skis or snowboard). Consequently, the information module 148 may generate the explanation 514 and send a communication including the explanation 514 to the merchant device 104-1, to notify the merchant that John Doe is proficient at upselling techniques, which increase the revenue per transaction.

The recommendations 506 may be determined based one or more of the explanations 506, such as explanations 512, 514 and 516, via a search of the recommendation database 146. Examples of recommendations include recommendations 518, 520 and 522. The recommendations 508 may be directed to actions the merchant may take for best addressing the explanations 506 associated with one or more detected lifts. In one example, a recommendation 518 may include that the merchant should consider hiring one or more multi-lingual employees in order to address an expected influx of foreign customers in accordance with explanation 512. As another example, a recommendation 520 may include that the merchant consider extending the hours of operation of the ski resort 114 to capture revenue from customer 116 (not shown in FIG. 5) activity within the geographic location of the ski resort 114. As yet another example, a recommendation 522 may include that the merchant 108-1 should consider scheduling John Doe 112 to work on Friday and Saturday evenings when foot traffic peaks and/or the amount of items purchased per transaction is suboptimal. Consequently, the information module 148 may generate at least one of the recommendations 518, 520 and 522, and send a communication including the recommendations 518, 520 and 522 to the merchant device 104-1. Further, in some examples, the explanations 512, 514 and 516 and/or the recommendations 518, 520 and 522 may be ordered within the display 504 in accordance with one or more rankings of the features associated with the explanations 512, 514 and 516.

The offers 510 may provide information associated with services, provided by the service provider or parties affiliated with the service provider, that may help the merchant 108-1 accomplish one or more of the recommendations 508. In one example, an offer 524 may include information about a service for marketing the ski resort 114 to prospective buyers 116 residing in the Eurozone in accordance with explanation 512 and recommendation 518. In another example, an offer 526 may include information about a service for loaning money to the merchant 108-1 in order to fund marketing activities in the Eurozone. In yet another example, an offer 528 may include information about a service offered by the service provider to help the merchant 108-1 operating the ski resort 114 to find multilingual employees in accordance with explanation 514 and recommendation 518. Consequently, the information module 148 may generate at least one of the offers 524, 526 and 528, and send a communication including the offers 524, 526 and 528 to the merchant device.

Figure 6A:
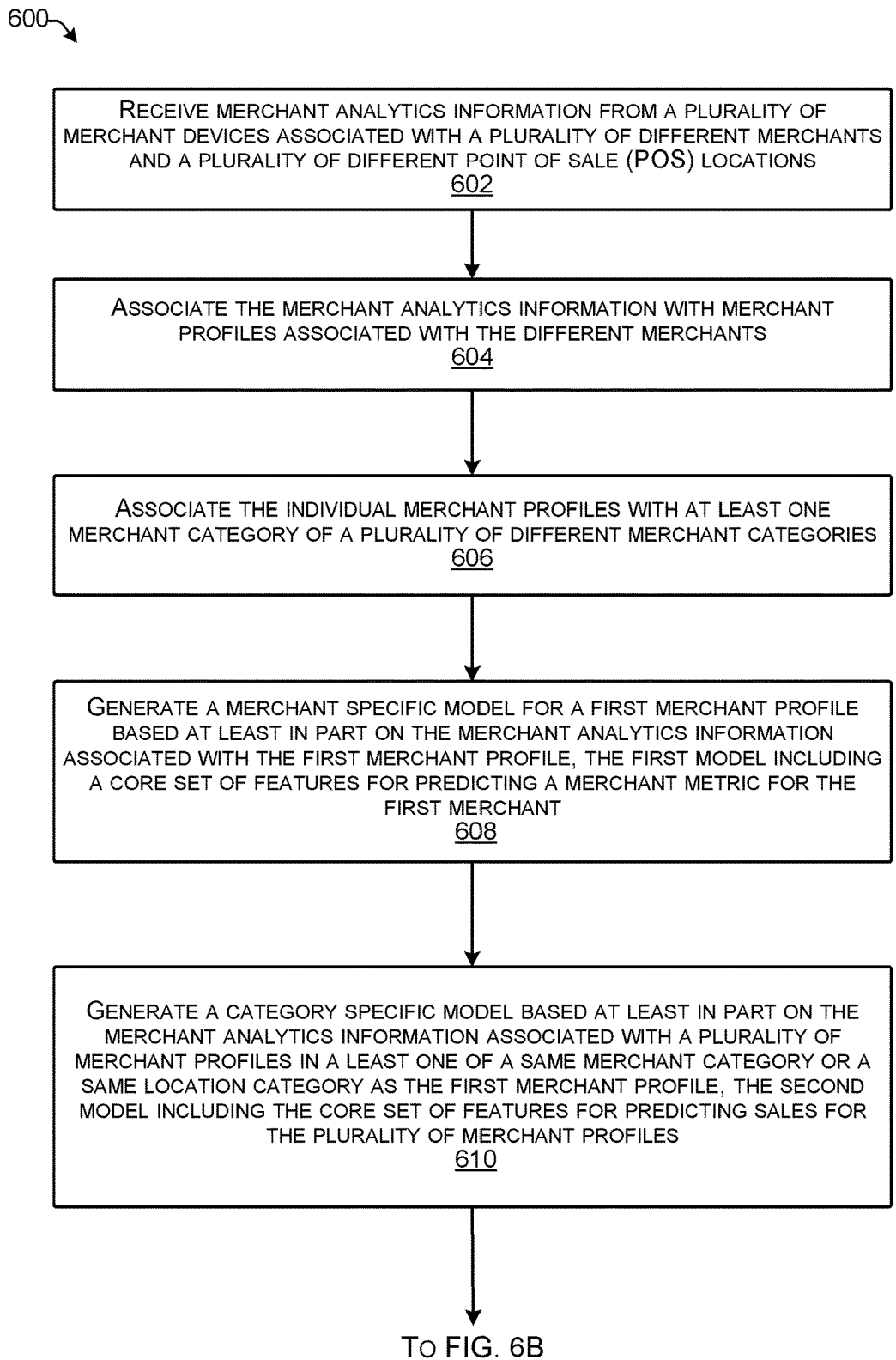
FIGS. 6A and 6B are flow diagrams illustrating an example process for detecting a lift and providing a merchant with information associated with the detected lift.
Figure 6B:
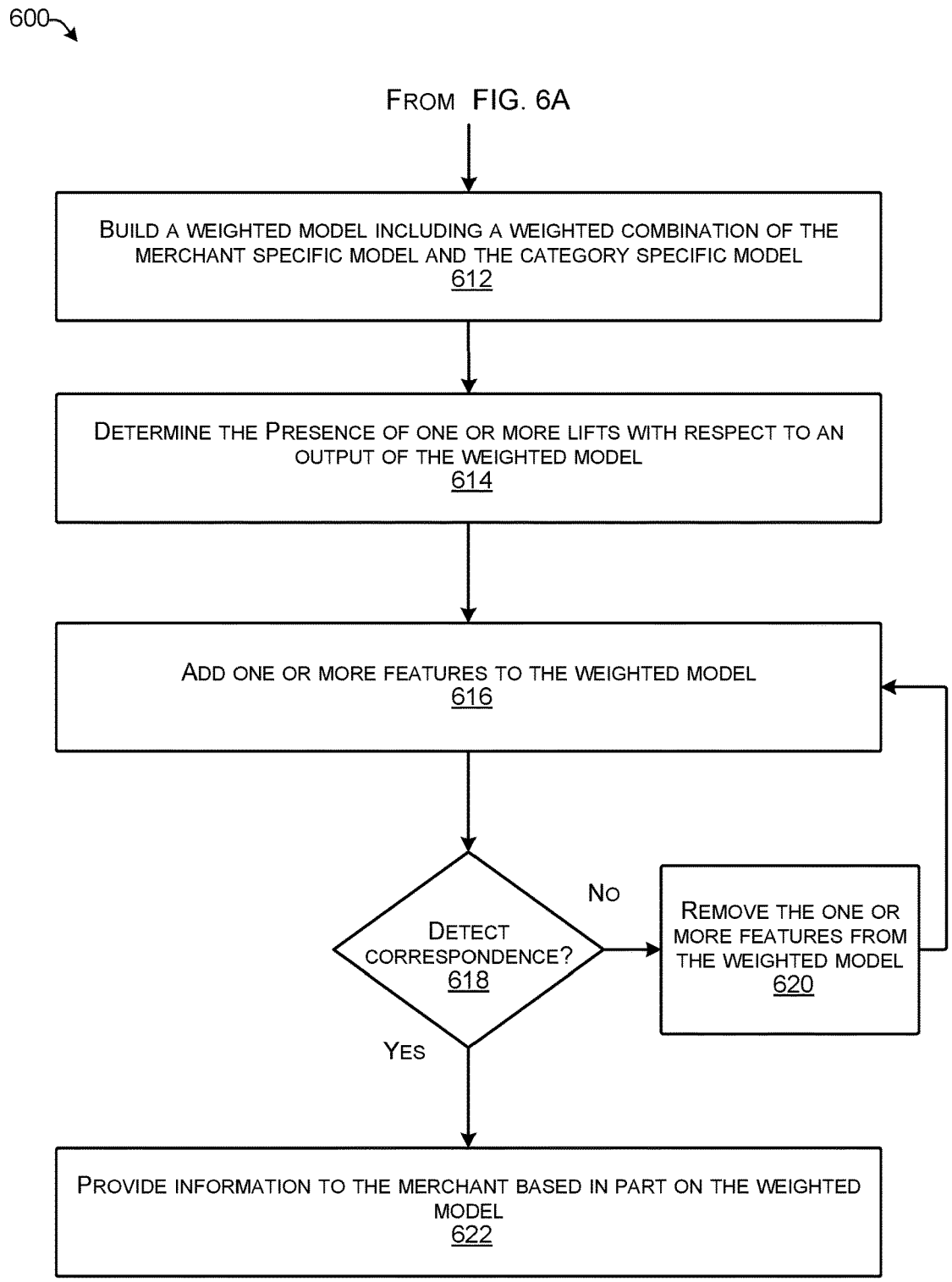

FIGS. 6A-6B are flow diagrams illustrating an example process 600 for detecting a lift and providing a merchant with information associated with the detected lift according to some implementations. The processes of FIGS. 6A, 6B and FIG. 7 below are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. Accordingly, in some implementations, the example processes 600 and 700 may be executed by one or more processors of the service computing device 102 of the service provider.

At 602, the one or more computing devices may receive merchant analytics information from a merchant device associated with a merchant. For instance, as discussed above with respect to FIG. 1, a plurality of the merchant devices 104 associated with a plurality of different merchants 108 may send merchant analytics information 122 for a plurality of merchant locations 114 to the information module 148. As an example, a merchant operating an umbrella shop may send merchant analytics information including sales number for a plurality of items offered for sale at the umbrella shop.

At 604, the one or more computing devices may associate the merchant analytics information with merchant profiles associated with the different merchants. For instance as discussed above with respect to FIG. 1, the profile management module 132 may associate merchant analytics information 122-1 received from a plurality of merchant devices 104 to a merchant profile 126 of a merchant 108-1 associated with the plurality of merchant devices 104-1. For example, the service provider may include the received sales numbers in a merchant profile associated with the umbrella shop.

At 606, the one or more computing devices may associate the individual merchant profiles with at least one merchant category of a plurality of different merchant categories. For instance, as discussed above with respect to FIG. 1, the profile management module 132 may aggregate and segment merchant profiles 126 into merchant categories. For example, the service provider may associate the merchant profile of the umbrella to a merchant category representing the geographic location of the umbrella shop (i.e., Kings County).

At 608, the one or more computing devices may generate a merchant specific model for a first merchant profile based at least in part on the merchant analytics information associated with the first merchant profile, the first model including a core set of features for predicting a merchant metric for a first merchant associated with the first merchant profile. For example, the model generator 134 may generate a merchant specific time model representing gross sales of umbrellas at the umbrella shop based in part on sales data included in the merchant profile associated with merchant profile of the umbrella shop. Further, the merchant specific model may include a trained penalized regression model that takes into consideration a core set of features of umbrella sales by the umbrella shop such as features representing the historical sales data of the umbrella shop, the day of the week, sales performance by merchants in the same geographic location, item prices, information about items offered for sale, and the local weather.

At 610, the one or more computing devices may generate a category specific model based at least in part on the merchant analytics information associated with a plurality of merchants profiles in a least one of a same merchant category or a same location category as the first merchant profile, the second model including the core set of features for predicting sales for the plurality of merchant profiles. For example, the model generator 134 may generate a category specific model representing the aggregate gross sales of merchants within the same the zip code as the umbrella shop. Further, the zip code specific model may include a trained penalized regression model that takes into consideration a core set of features of merchant sales within the zip code such as features representing historical sales data, the day of the week, a local event calendar, and a calendar of sales tax holidays.

At 612, the one or more computing devices may build a weighted model including a weighted combination of the merchant specific model and the category specific model. For example, the model generator 134 may generate a model based in part on a weighted combination of the umbrella shop specific gross sales model and the zip code specific gross sales model.

At 614, the one or more computing devices may determine the presence of one or more lifts with respect to an output of the weight model. For instance, as discussed above with respect to FIGS. 1-3, the lift analysis module 144 may compare the output of the weighted model to the observed values of the metric, and detect lifts between the predicted values and the observed values. For example, lift analysis module 144 may compare predicted values for umbrella sales to the observed umbrella sales. Further, the lift analysis module 144 may detect lifts in the observed values with respect to the predicted values based in part on a difference between the predicted values and observed values during a period of time exceeding a predetermined threshold (e.g., two standard deviations).

At 616, the one or more computing devices may add one or more features to the weighted model. For example, the lift analysis module 144 may add a feature representing an employee schedule at the umbrella shop to the weighted model, and recompute the weighted model.

At 618, the one or more computing devices may detect a correspondence between the output of the recomputed weighted model and the observed values of the metric. For instance as discussed above with respect to FIGS. 1-3, the lift analysis module 144 may determine whether the lift has disappeared or a residual value associated with the lift has decreased to a value below a threshold amount. For example, the one or more computing devices may compare predicted umbrella sales as predicted by the recomputed model that incorporates the employee schedule to observed umbrella sales at the umbrella shop.

At 620, when there is not a detected correspondence between the predicted values and the observed values of the metric, the one or more computing devices may remove the one or more added features from the weighted model and recompute the model. Further, the process may subsequently evaluate another one or more features at step 618. For example, if the incorporation of the employee schedule does not cause the predicted values to correspond to the actual umbrella sales, the lift analysis module may remove the employee schedule feature from the weighted model and evaluate another feature.

At 622, when there is a detected correspondence between the output of the weighted model and the observed values of the metric, the one or more computing devices may provide information to the merchant based in part on the weighted model. For instance as discussed above with respect to FIGS. 1 and 4-5, the information module 148 may provide information 150 to the merchant device 104 including at least one of an explanation, recommendation and/or offer. For example, when the lift analysis module 144 determines that the predicted umbrella sales corresponds to the actual umbrella sales, the information module 148 may send the merchant device 104 a message including a forecast of future umbrella sales using the weighted model. As another example, the information module 148 may send the merchant device 104 a message including one or more recommendations for adjusting the employee schedule to increase umbrella sales.

FIG. 7 illustrates an example process for detecting a feature based in part on determining the existence of a lift according to some implementations.

At 702, the one or more computing devices may receive merchant analytics information from a plurality of merchant devices associated with a plurality of different merchants and a plurality of different point of sale (POS) locations. For instance, as discussed above with respect to FIG. 1, a plurality of the merchant devices 104 associated with a plurality of different merchants 108 may send merchant analytics information 122 for a plurality of merchant locations 114 to the information module 148. As an example, a merchant operating a ski resort may send merchant analytics information including monthly foot traffic at the ski resort.

At 704, the one or more computing devices may associate the merchant analytics information with merchant profiles associated with the different merchants. For instance as discussed above with respect to FIG. 1, the profile management module 132 may associate merchant analytics information received from a plurality of merchant devices 104 to a merchant profile 126 of a merchant 108-1 associated with the plurality of merchant devices 104-1. For example, the service provider may include the received foot traffic data in a merchant profile associated with the ski resort.

At 706, the one or more computing devices may associate the individual merchant profiles with at least one merchant category of a plurality of different merchant categories. For instance, as discussed above with respect to FIG. 1, the profile management module 132 may aggregate and segment merchant profiles 126 into merchant categories. For example, the service provider may associate the merchant profile of the ski resort to a merchant category representing the representing the hospitality industry.

At 708, the one or more computing devices may generate a plurality of merchant specific models for individual merchant profiles based at least in part on the merchant analytics information associated with the individual merchant profiles, the models including a core set of features for predicting a merchant metric for the individual merchants. For example, the model generator 134 may generate a plurality of category specific models representing foot traffic for merchants within the hospitality industry. Further, the industry specific model may include a trained penalized regression model that takes into consideration a core set of features of foot traffic within the hospitality industry such as features representing historical foot traffic data, promotional weekends, local weather, seasonality, and a calendar of holidays.

At 710, the one or more computing devices may determine the presence of corresponding lifts with respect to output values of a subset of the plurality merchant specific models belonging to a common merchant category, such that the corresponding lifts do not have an associated feature. For example, lift analysis module 144 may detect the presence of lifts between the predicted foot traffic values and the observed values at a plurality of merchants associated with the hospitality industry merchant category. Further, the lift analysis module 144 may further determine that the database of features 136 does not include any features associated with the lifts.

At 712, the one or more computing devices may determine one or more parameters associated with the corresponding lifts. For example, the feature detection module may determine that the majority of the lifts appear between the last two weeks of May every other year.

At 714, the one or more computing devices may generate a feature representing the corresponding lifts based in part on a time value associated with the corresponding lifts. For example, feature detection module may generate a binary time series capable of informing a model of the occurrence of an event between the last two weeks of May every other year.

At 716, the one or more computing devices may incorporate the feature into at least one of the merchant specific models associated with a merchant profile belonging to the merchant category. For example, the binary tire series may be added to one or more merchant profiles associated with the hospitality industry.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 8:
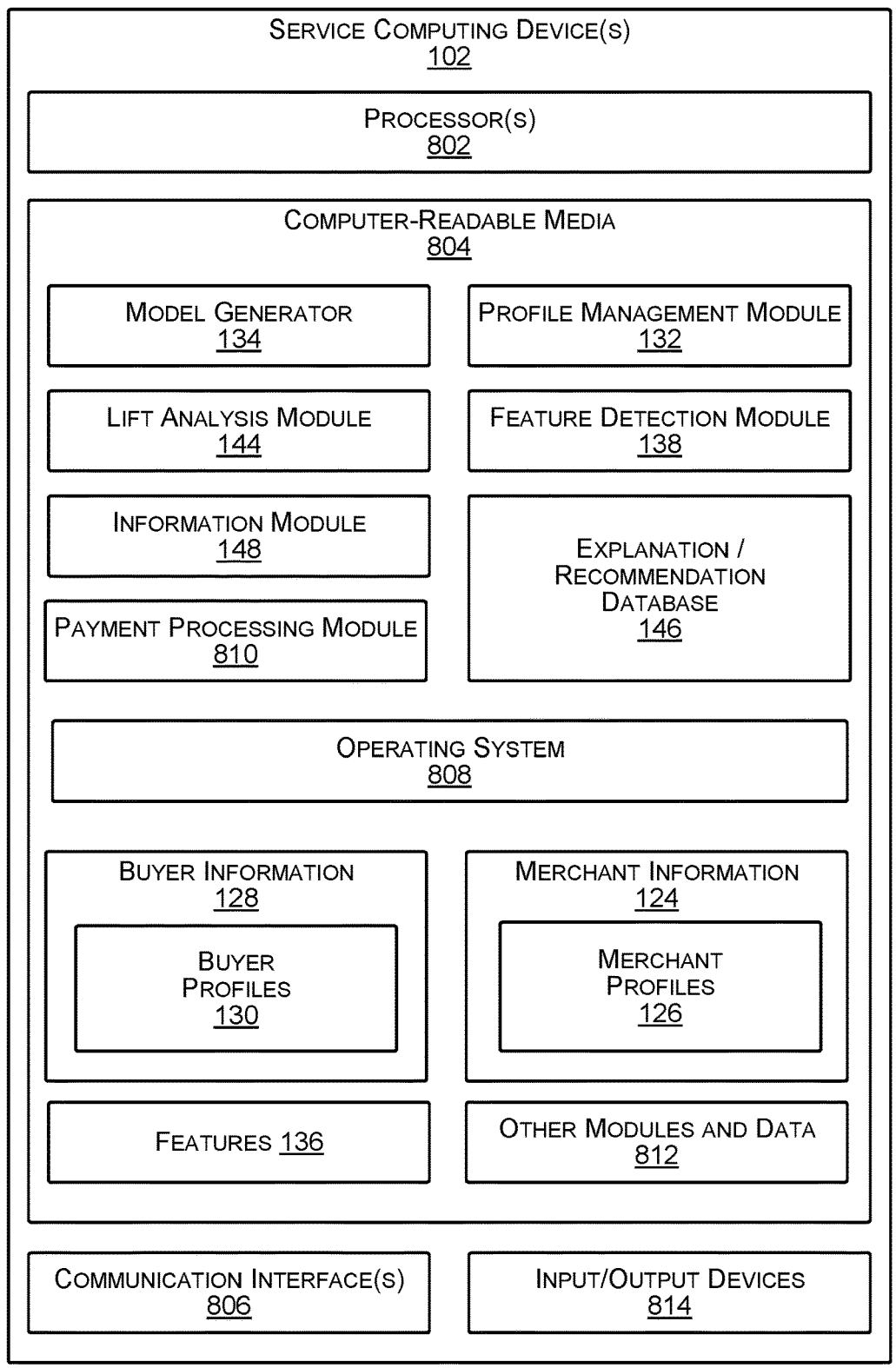
FIG. 8 illustrates select components of one or more example service computing devices according to some implementations.

FIG. 8 illustrates select components of the service computing device 102 that may be used to implement some functionality of the payment and information service described herein. The service computing device 102 may be operated by a service provider that provides the payment service and the information service, and may include one or more servers or other types of computing devices that may be embodied in any number of ways. For instance, in the case of a server, the modules, other functional components, and data may be implemented on a single server, a cluster of servers, a server farm or data center, a cloud-hosted computing service, a cloud-hosted storage service, and so forth, although other computer architectures may additionally or alternatively be used.

Further, while the figures illustrate the components and data of the service computing device 102 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 102 may be located together or separately, and organized, for example, as virtual servers, server banks and/or server farms. The described functionality may be provided by the servers of a single entity or enterprise, or may be provided by the servers and/or services of multiple different buyers or enterprises.

In the illustrated example, each service computing device 102 may include one or more processors 802, one or more computer-readable media 804, and one or more communication interfaces 806. Each processor 802 may be a single processing unit or a number of processing units, and may include single or multiple computing units or multiple processing cores. The processor(s) 802 can be implemented as one or more microprocessors, microcomputers, microcontrollers, digital signal processors, central processing units, state machines, logic circuitries, and/or any devices that manipulate signals based on operational instructions. For instance, the processor(s) 802 may be one or more hardware processors and/or logic circuits of any suitable type specifically programmed or configured to execute the algorithms and processes described herein. The processor(s) 802 can be configured to fetch and execute computer-readable instructions stored in the computer-readable media 804, which can program the processor(s) 802 to perform the functions described herein.

The computer-readable media 804 may include volatile and nonvolatile memory and/or removable and non-removable media implemented in any type of technology for storage of information, such as computer-readable instructions, data structures, program modules, or other data. Such computer-readable media 804 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 804 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 804 may be used to store any number of functional components that are executable by the processors 802. In many implementations, these functional components comprise instructions or programs that are executable by the processors 802 and that, when executed, specifically configure the one or more processors 802 to perform the actions attributed above to the service computing device 102. Functional components stored in the computer-readable media 804 may include the model generator 134, the profile management module 132, the feature detection module 138, the lift analysis module 144, and the information module 148.

Additional functional components stored in the computer-readable media 804 may include an operating system 808 for controlling and managing various functions of the service computing device 102, and a payment processing module 810 for processing payments made through the merchant application 110 and, in some cases, the buyer application 120. For example, the payment processing module 810 may receive transaction information, such as an amount of the transaction, and may verify that a particular payment card can be used to pay for the transaction, such as by contacting a card clearinghouse computing device or other bank computing device (not shown in FIG. 8). In some examples, the payment processing module 810 may redirect payment information for transactions to a bank computing device, while in other examples, the merchant devices 104 may communicate directly with an appropriate bank computing device for approving or denying a transaction using a payment card for a particular transaction.

In addition, the computer-readable media 804 may store data used for performing the operations described herein. Thus, the computer-readable media may store the merchant information 124, including the merchant profiles 126, and the buyer information 128, including the buyer profiles 130. In addition, the service computing device 102 may store, may access and/or may generate features 136 and/or the explanation/recommendation database 146, as discussed above. The service computing device 102 may also include or maintain other functional components and data, such as other modules and data 812, which may include programs, drivers, etc., and the data used or generated by the functional components. Further, the service computing device 102 may include many other logical, programmatic and physical components, of which those described above are merely examples that are related to the discussion herein.

The communication interface(s) 806 may include one or more interfaces and hardware components for enabling communication with various other devices, such as over the network(s) 106. For example, communication interface(s) 806 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The service computing device 102 may further be equipped with various input/output (I/O) devices 814. Such I/O devices 814 may include a display, various user interface controls (e.g., buttons, joystick, keyboard, mouse, touch screen, etc.), audio speakers, connection ports and so forth.

Figure 9:
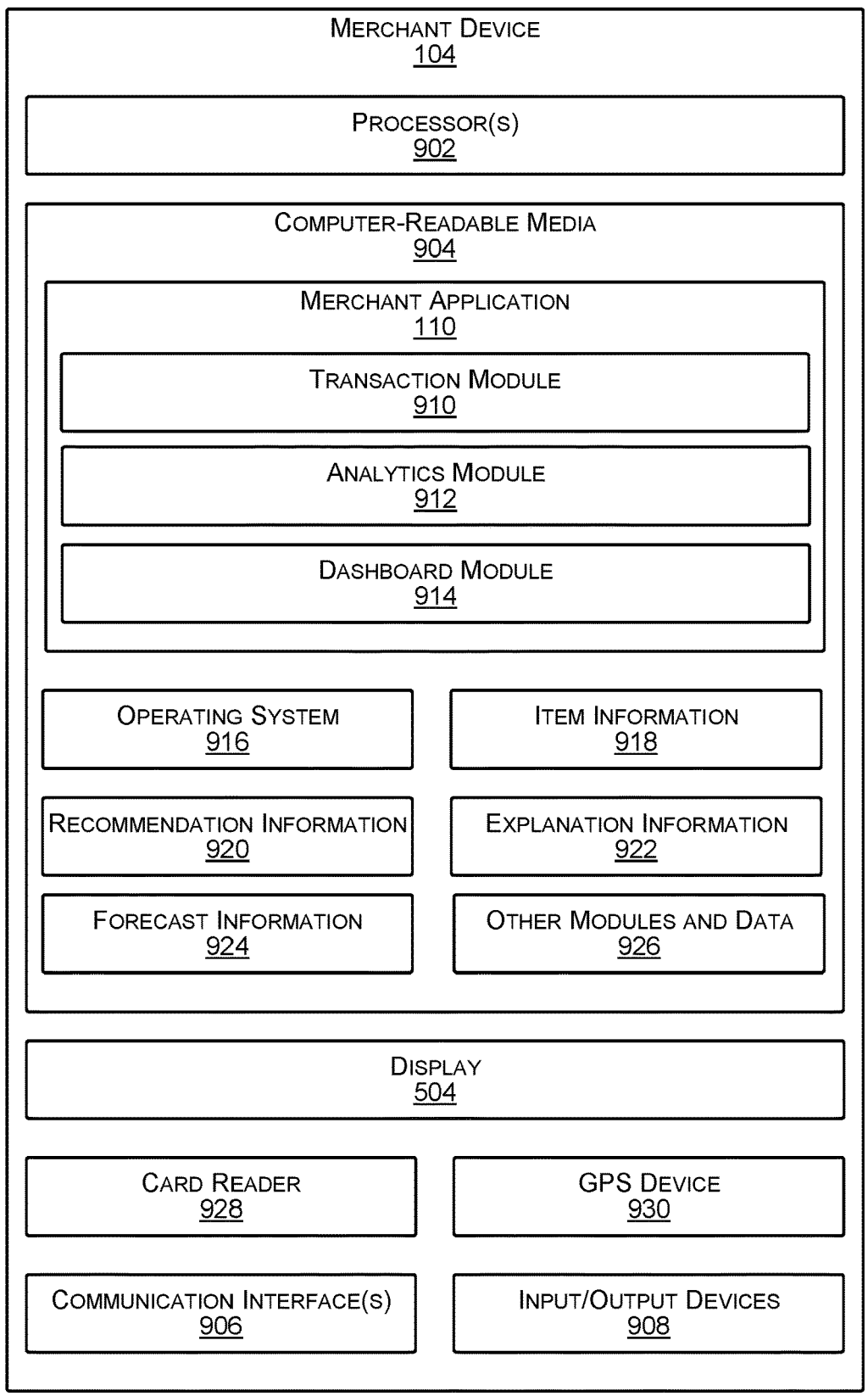
FIG. 9 illustrates select components of an example merchant device according to some implementations.

FIG. 9 illustrates select example components of an example merchant device 104 according to some implementations. The merchant device 104 may be any suitable type of computing device, e.g., portable, semi-portable, semi-stationary, or stationary. Some examples of the merchant device 104 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the merchant device 104 includes at least one processor 902, one or more computer-readable media 904, one or more communication interfaces 906, and one or more input/output (I/O) devices 908. Each processor 902 may itself comprise one or more processors or processing cores. For example, the processor 902 can be implemented as one or more microprocessors, microcomputers, microcontrollers, digital signal processors, central processing units, state machines, logic circuitries, and/or any devices that manipulate signals based on operational instructions. In some cases, the processor 902 may be one or more hardware processors and/or logic circuits of any suitable type specifically programmed or configured to execute the algorithms and processes described herein. The processor 902 can be configured to fetch and execute computer-readable processor-executable instructions stored in the computer-readable media 904.

Depending on the configuration of the merchant device 104, the computer-readable media 904 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 904 may include, but is not limited to, RAM, ROM, EEPROM, flash memory, solid-state storage, magnetic disk storage, optical storage, and/or other computer-readable media technology. Further, in some cases, the merchant device 104 may access external storage, such as RAID storage systems, storage arrays, network attached storage, storage area networks, cloud storage, or any other medium that can be used to store information and that can be accessed by the processor 902 directly or through another computing device or network. Accordingly, the computer-readable media 904 may be computer storage media able to store instructions, modules or components that may be executed by the processor 902. Further, when mentioned, non-transitory computer-readable media exclude media such as energy, carrier signals, electromagnetic waves, and signals per se.

The computer-readable media 904 may be used to store and maintain any number of functional components that are executable by the processor 902. In some implementations, these functional components comprise instructions or programs that are executable by the processor 902 and that, when executed, implement operational logic for performing the actions and services attributed above to the merchant device 104. Functional components of the merchant device 104 stored in the computer-readable media 904 may include the merchant application 110. In this example, the merchant application 110 includes a transaction module 910, an analytics module 912, and a dashboard module 914. For example, the transaction module 910 may present an interface, such as a payment interface, as discussed above, to enable the merchant to conduct transactions, receive payments, and so forth, as well as for communicating with the service computing device 102 for processing payments and sending transaction information. In addition, the analytics module 912 may collect and analyze information associated with merchant performance. The analytics module may further generate the merchant analytics information 122 (not shown in FIG. 9), and send the merchant analytics information 122 to the service provider. Further, the dashboard module 914 may present a setup interface to enable the merchant to setup items, such as for adding new items or modifying information for existing items. The dashboard module 914 may further enable the merchant to manage the merchant's account, the merchant profile, merchant preferences, view saved or new information, and the like. Additional functional components may include an operating system 916 for controlling and managing various functions of the merchant device 104 and for enabling basic user interactions with the merchant device 104.

In addition, the computer-readable media 904 may also store data, data structures and the like, that are used by the functional components. For example, data stored by the computer-readable media 904 may include item information 918 that includes information about the items offered by the merchant, which may include a list of items currently available from the merchant, images of the items, descriptions of the items, prices of the items, and so forth. Furthermore, the computer readable media may have stored thereon recommendation information 920, explanation information 922, and forecast information 924 that has been received from the service provider and stored at least temporarily, or the like. Depending on the type of the merchant device 104, the computer-readable media 904 may also optionally include other functional components and data, such as other modules and data 926, which may include programs, drivers, etc., and the data used or generated by the functional components. Further, the merchant device 104 may include many other logical, programmatic and physical components, of which those described are merely examples that are related to the discussion herein.

The communication interface(s) 906 may include one or more interfaces and hardware components for enabling communication with various other devices, such as over the network(s) 106 or directly. For example, communication interface(s) 906 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 9 further illustrates that the merchant device 104 may include the display 504 mentioned above. Depending on the type of computing device used as the merchant device 104, the display 504 may employ any suitable display technology. For example, the display 504 may be a liquid crystal display, a plasma display, a light emitting diode display, an OLED (organic light-emitting diode) display, an electronic paper display, or any other suitable type of display able to present digital content thereon. In some examples, the display 504 may have a touch sensor associated with the display 504 to provide a touchscreen display configured to receive touch inputs for enabling interaction with a graphic interface presented on the display 504. Accordingly, implementations herein are not limited to any particular display technology. Alternatively, in some examples, the merchant device 104 may not include the display 504, and information may be presented by other means, such as aurally.

The merchant device 104 may further include the one or more I/O devices 908. The I/O devices 908 may include speakers, a microphone, a camera, and various user controls (e.g., buttons, a joystick, a keyboard, a keypad, etc.), a haptic output device, and so forth.

In addition, the merchant device 104 may include or may be connectable to a card reader 928. In some examples, the card reader may plug in to a port in the merchant device, such as a microphone/headphone port, a data port, or other suitable port. The card reader may include a read head for reading a magnetic strip of a payment card, and further may include encryption technology for encrypting the information read from the magnetic strip. Alternatively, numerous other types of card readers may be employed with the merchant devices 104 herein, depending on the type and configuration of the merchant device 104.

Other components included in the merchant device 104 may include various types of sensors, which may include a GPS device 930 able to indicate location information, as well as other sensors (not shown) such as an accelerometer, gyroscope, compass, proximity sensor, and the like. Additionally, the merchant device 104 may include various other components that are not shown, examples of which include removable storage, a power source, such as a battery and power control unit, and so forth.

Figure 10:
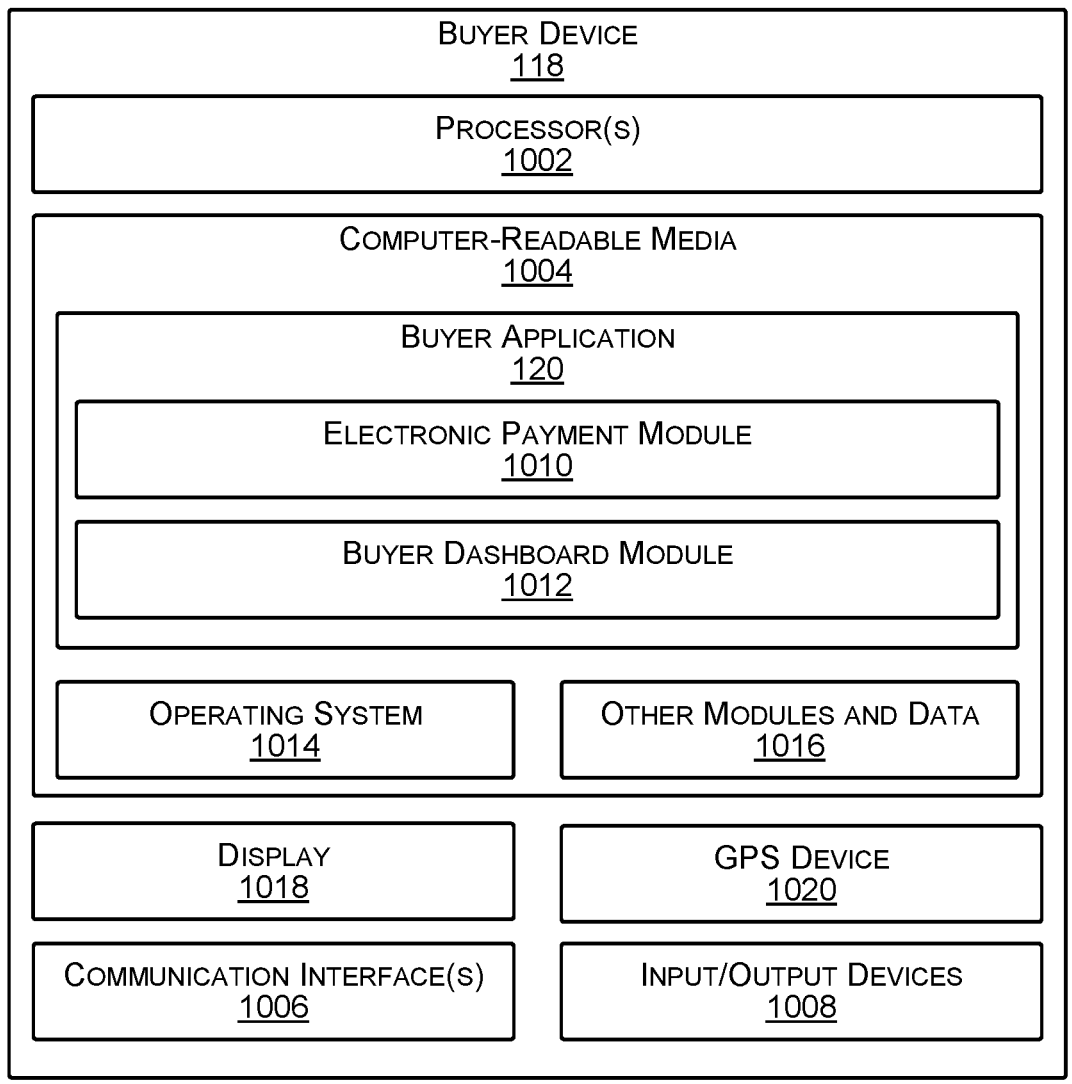
FIG. 10 illustrates select components of an example buyer device according to some implementations.

FIG. 10 illustrates select example components of the buyer device 118 that may implement the functionality described above according to some examples. The buyer device 118 may be any of a number of different types of portable computing devices. Some examples of the buyer device 118 may include smart phones and mobile communication devices; tablet computing devices; laptops, netbooks and other portable computers; wearable computing devices and/or body-mounted computing devices, which may include watches and augmented reality devices, such as helmets, goggles or glasses; and any other portable device capable of sending communications and performing the functions according to the techniques described herein.

In the example of FIG. 10, the buyer device 118 includes components such as at least one processor 1002, one or more computer-readable media 1004, one or more communication interfaces 1006, and one or more input/output (I/O) devices 1008. Each processor 1002 may itself comprise one or more processors or processing cores. For example, the processor 1002 can be implemented as one or more microprocessors, microcomputers, microcontrollers, digital signal processors, central processing units, state machines, logic circuitries, and/or any devices that manipulate signals based on operational instructions. In some cases, the processor 1002 may be one or more hardware processors and/or logic circuits of any suitable type specifically programmed or configured to execute the algorithms and processes described herein. The processor 1002 can be configured to fetch and execute computer-readable processor-executable instructions stored in the computer-readable media 1004.

Depending on the configuration of the buyer device 118, the computer-readable media 1004 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 1004 may include, but is not limited to, RAM, ROM, EEPROM, flash memory, solid-state storage, magnetic disk storage, optical storage, and/or other computer-readable media technology. Further, in some cases, the buyer device 118 may access external storage, such as RAID storage systems, storage arrays, network attached storage, storage area networks, cloud storage, or any other medium that can be used to store information and that can be accessed by the processor 1002 directly or through another computing device or network. Accordingly, the computer-readable media 1004 may be computer storage media able to store instructions, modules or components that may be executed by the processor 1002. Further, when mentioned, non-transitory computer-readable media exclude media such as energy, carrier signals, electromagnetic waves, and signals per se.

The computer-readable media 1004 may be used to store and maintain any number of functional components that are executable by the processor 1002. In some implementations, these functional components comprise instructions or programs that are executable by the processor 1002 and that, when executed, implement operational logic for performing the actions and services attributed above to the buyer device 118. Functional components of the buyer device 118 stored in the computer-readable media 1004 may include the buyer application 120, as discussed above. In this example, the buyer application 120 includes an electronic payment module 1010, which enables the buyer to use the buyer device 118 to make electronic payments, as discussed above, and a buyer dashboard module 1012. For example, the buyer dashboard module 1012 may present the buyer with an interface for managing the buyer's account, changing information, changing preferences, and so forth. Additional functional components may include an operating system 1014 for controlling and managing various functions of the buyer device 118 and for enabling basic user interactions with the buyer device 118.

In addition, the computer-readable media 1004 may also store data, data structures and the like, that are used by the functional components. Depending on the type of the buyer device 118, the computer-readable media 1004 may also optionally include other functional components and data, such as other modules and data 1016, which may include applications, programs, drivers, etc., and the data used or generated by the functional components. Further, the buyer device 118 may include many other logical, programmatic and physical components, of which those described are merely examples that are related to the discussion herein.

The communication interface(s) 1006 may include one or more interfaces and hardware components for enabling communication with various other devices, such as over the network(s) 106 or directly. For example, communication interface(s) 1006 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 10 further illustrates that the buyer device 118 may include a display 1018. Depending on the type of computing device used as the buyer device 118, the display may employ any suitable display technology. For example, the display 1018 may be a liquid crystal display, a plasma display, a light emitting diode display, an OLED (organic light-emitting diode) display, an electronic paper display, or any other suitable type of display able to present digital content thereon. In some examples, the display 1018 may have a touch sensor associated with the display 1018 to provide a touchscreen display configured to receive touch inputs for enabling interaction with a graphic interface presented on the display 1018. Accordingly, implementations herein are not limited to any particular display technology. Alternatively, in some examples, the buyer device 118 may not include a display.

The buyer device 118 may further include the one or more I/O devices 1008. The I/O devices 1008 may include speakers, a microphone, a camera, and various user controls (e.g., buttons, a joystick, a keyboard, a keypad, etc.), a haptic output device, and so forth.

Other components included in the buyer device 118 may include various types of sensors, which may include a GPS device 1020 able to indicate location information, as well as other sensors (not shown) such as an accelerometer, gyroscope, compass, proximity sensor, and the like. Additionally, the buyer device 118 may include various other components that are not shown, examples of which include removable storage, a power source, such as a battery and power control unit, and so forth.

Various instructions, methods and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
one or more first point of sale (POS) devices associated with a first merchant;
one or more second POS devices associated with a second merchant; and
a payment-processing system to process transactions on behalf of the first merchant and the second merchant, the payment-processing system being disposed between a plurality of POS devices, including the one or more first POS devices and the one or more second POS devices, and at least one payment-fulfillment service, the payment-processing system comprising:
one or more processors; and
one or more computer-readable media storing instructions that, when executed by the one or more processors, cause the one or more processors to perform operations comprising:
receiving, over a network, first transaction information for a plurality of first transactions from the one or more first POS devices;
receiving, over the network, second transaction information for a plurality of second transactions from the one or more second POS devices;
associating the first transaction information with a first merchant profile associated with the first merchant;
associating the second transaction information with at least a second merchant profile associated with the second merchant;
generating a first model for the first merchant profile based at least in part on the first transaction information associated with the first merchant profile, wherein the first model includes a first set of features for predicting transactions for the first merchant;
generating a second model for the second merchant profile based at least in part on the second transaction information associated with the second merchant profile, wherein the second model includes the first set of features for predicting transactions for the second merchant;
adding an additional feature to the first model, wherein the additional feature includes an item;
determining, based at least in part on the first model and the second model, a predicted quantity of sale of the item if the item is offered by the first merchant; and
sending, over the network, a message to a merchant device associated with the first merchant profile, the message based at least in part on the predicted quantity of sale.

2. The system of claim 1; comprising further instructions that, when executed by the one or more processors, cause the one or more processors to perform operations comprising:
determining an explanation associated with the predicted quantity of sale; and
including, in the message, the explanation.

3. The system of claim 1, wherein:
none of the plurality of the first transactions are associated with the item; and
at least one of the plurality of second transactions is associated with the item.

4. The system of claim 1, comprising further instructions that, when executed by the one or more processors, cause the one or more processors to perform operations comprising:
determining; for the additional feature added to the first set of features of the first model, a degree to which the additional feature contributes to the predicted quantity of sale; and
including, in the message, an indication of the degree to which e additional feature contributes to the predicted quantity of sale.

5. The system of claim 1, comprising further instructions that, when executed by the one or more processors, cause the one or more processors to perform operations comprising:
determining a time series forecast for the predicted quantity of sale and an indication of a degree to which the additional feature contributes to the time series forecast; and
sending, over the network and to the merchant device associated with the first merchant profile, the time series forecast and the indication of the degree to which the additional feature contributes.

6. The system of claim 1, wherein the predicted sale performance comprises a first predicted sale performance, comprising further instructions that, when executed by the one or more processors, cause the one or more processors to perform operations comprising:
prior to adding the additional feature to the first model, determining a second predicted quantity of sale associated with the merchant profile based at least in part on the first model;
determining a difference between the second predicted quantity of sale and the first predicted quantity of sale; and sending, over the network and to the merchant device associated with the first merchant profile, an indication of the difference with the message.

7. A system comprising:
one or more first point of sale (POS) device associated with a first merchant;
one or more second POS device associated with a second merchant; and
a payment-processing system to process transactions on behalf of the first merchant and the second merchant, the payment-processing system being disposed between POS devices, including the one or more first POS devices and the one or more second POS devices, and at least one payment-fulfillment service, the payment-processing system comprising:
one or more processors; and
one or more computer-readable media storing instructions that, when executed by the one or more processors, cause the one or more processors to perform operations comprising:
receiving, over a network, first transaction information for first transactions from the one or more first POS devices, wherein at least one of the first transactions is associated with an item;
receiving, over the network, second transaction information for second transactions from the one or more second POS devices, wherein none of the second transactions are associated with the item;
generating a first model based at least in part on the first transaction information, wherein the first model includes a feature corresponding to the item;
generating a second model based at least in part on the second transaction information, wherein the second model includes a set of features for predicting transactions for the one or more second POS device;
adding the feature corresponding to the item to the second model;
determining, based at least in part on the second model, a predicted quantity of sale of the item for the second merchant if the second merchant offers the item; and
providing, to a merchant device associated with the second merchant, a message based at least in part on the predicted quantity of sale.

8. The system of claim 7, comprising further instructions that, when executed by the one or more processors, cause the one or more processors to perform operations comprising:
determining, based at least in part on the first transaction information, that the first merchant experienced an increase in sales associated with the item,
wherein determining the predicted quantity of sale is based at least in part on the increase in sales associated with the item.

9. The system of claim 7, comprising further instructions that, when executed by the one or more processors, cause the one or more processors to perform operations comprising:
determining, for the feature added to the second model, a degree to which the feature contributes to the predicted quantity of sale; and
providing, to the merchant device associated with the second merchant, an indication of the degree to which the feature contributes to the predicted quantity of sale.

10. The system of claim 7, comprising further instructions that, when executed by the one or more processors, cause the one or more processors to perform operations comprising:
determining a time series forecast for the predicted quantity of sale; and
providing, to the merchant device associated with the second merchant, the time series forecast.

11. The system of claim 7, comprising further instructions that, when executed by the one or more processors, cause the one or more processors to perform operations comprising:
determining an explanation associated with the predicted quantity of sale; and
providing the explanation to the merchant device associated with the second merchant.

12. The system of claim 7, wherein the predicted q amity of sale comprises a first predicted quantity of sale, comprising further instructions that, when executed by the one or more processors, cause the one or more processors to perform operations comprising:
determining, based at least in part on the second transaction information, a second predicted quantity of sale associated with the second merchant if the second merchant does not offer the item; and
providing, to the merchant device associated with the second merchant, the second predicted quantity of sale.

13. The system of claim 7, the operations further comprising:
determining one or more attributes associated with the first merchant; and
selecting the second merchant from multiple merchants associated with the payment-processing system based at least in part on the second merchant being associated with the one or more attributes.

14. A method comprising:
receiving, at a payment-processing system to process transactions on behalf of a first merchant and a second merchant, first transaction information from one or more first point of sale (POS) devices and second transaction information from one or more second POS devices, the first transaction information for first transactions, at least one of the first transactions being associated with an item, the second transaction information for second transactions unassociated with the item, the payment-processing system being disposed between POS devices, including the one or more first POS devices associated with the first merchant and the one or more second POS devices associated with the second merchant, and at least one payment-fulfillment service;
generating a first model based at least in part on the first transaction information, wherein the first model includes a feature corresponding to the item;
generating a second model based at least in part on the second transaction information, wherein the second model includes a set of features for predicting transactions for the second merchant;
adding the feature to the second model;
determining, based at least in part on the second model, a predicted quantity of sale of the item for the second merchant if the second merchant offers the item for sale; and
providing, to a merchant device associated with the second merchant, a message based at least in part on the predicted quantity of sale.

15. The method of claim 14, further comprising:
determining, based at least in part on the first transaction information, that the first merchant experienced an increase in sales associated with the item, wherein determining the predicted quantity of sale is based at least in part on the increase in sales associated with the item.

16. The method of claim 14, further comprising:

determining a degree to which the item contributes to the predicted quantity of sale; and providing, to the merchant device associated with the second merchant, the degree to which the item contributes to the predicted quantity of sale.

17. The method of claim 14, further comprising:

determining a time series forecast for the predicted quantity of sale; and providing, to the merchant device associated with the second merchant, the time series forecast.

18. The method of claim 14, wherein the predicted quantity of sale comprises a first predicted quantity of sale, the method further comprising:

determining, based at least in part on the second transaction information, a second predicted quantity of sale associated with the second merchant if the second merchant does not offer the item; and providing, to the merchant device associated with the second merchant, the second predicted quantity of sale.

19. The method of claim 14, further comprising:

determining an explanation associated with the predicted quantity of sale; and providing the explanation to the merchant device associated with the second merchant.

\* \* \* \* \*